United States Patent
Park et al.

(10) Patent No.: US 11,387,950 B2
(45) Date of Patent: Jul. 12, 2022

(54) METHOD AND APPARATUS FOR TRANSMITTING DATA BASED ON GRANT FREE IN WIRELESS COMMUNICATION SYSTEM

(71) Applicant: Samsung Electronics Co., Ltd., Suwon-si (KR)

(72) Inventors: Sungjin Park, Suwon-si (KR); Hyunseok Ryu, Suwon-si (KR); Jeongho Yeo, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 16/683,618

(22) Filed: Nov. 14, 2019

(65) Prior Publication Data

US 2020/0153560 A1 May 14, 2020

(30) Foreign Application Priority Data

Nov. 14, 2018 (KR) .................. 10-2018-0140226
Feb. 1, 2019 (KR) .................. 10-2019-0013567

(51) Int. Cl.
  *H04L 1/18* (2006.01)
  *H04W 72/04* (2009.01)
  (Continued)

(52) U.S. Cl.
  CPC .......... *H04L 1/1819* (2013.01); *H04L 5/0092* (2013.01); *H04W 72/042* (2013.01); *H04W 72/0493* (2013.01); *H04W 72/1257* (2013.01)

(58) Field of Classification Search
  CPC .. H04L 1/1819; H04L 5/0092; H04W 72/042; H04W 72/0493; H04W 72/1257
  See application file for complete search history.

(56) References Cited

U.S. PATENT DOCUMENTS

2018/0049217 A1   2/2018  Dinan et al.
2018/0123765 A1*  5/2018  Cao .................. H04L 1/1896
(Continued)

OTHER PUBLICATIONS

NTT Docomo, Inc.; Enhanced UL transmission with configured grant for URLLC; 3GPP TSG RAN WG1 Meeting #95; R1-1813329; Nov. 12-16, 2018; Spokane, USA.
(Continued)

*Primary Examiner* — Jeffrey M Rutkowski
*Assistant Examiner* — Chae S Lee
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for Internet of Things (IoT) are provided. The system and method provides for receiving, from a base station, downlink control information (DCI) including information on a hybrid automatic repeat request (HARQ) process number, identifying at least one grant free resource corresponding to the information on the HARQ process number, and releasing the at least one grant free resource based on the information. The disclosure discloses a grant-free based data transmission method in a wireless communication system that may be applied to intelligent services based on the 5G communication technology and the IoT-related technology, such as smart home, smart building, smart city, smart car, connected car, health care, digital education, smart retail, security and safety services.

16 Claims, 10 Drawing Sheets

(51) Int. Cl.
*H04W 72/12* (2009.01)
*H04L 5/00* (2006.01)

(56) References Cited

U.S. PATENT DOCUMENTS

| | | | | |
|---|---|---|---|---|
| 2018/0288746 | A1* | 10/2018 | Zhang | ............... H04L 1/0031 |
| 2018/0288795 | A1 | 10/2018 | Zhang et al. | |
| 2018/0323909 | A1* | 11/2018 | Ying | ............... H04L 1/0072 |
| 2020/0275485 | A1* | 8/2020 | Babaei | ............ H04W 74/0808 |
| 2020/0404668 | A1* | 12/2020 | Nakamura | ............ H04L 1/1822 |

OTHER PUBLICATIONS

Ericsson; Maintenance issues of DL/UL scheduling and HARQ procedure; 3GPP TSG-RAN WG1 Meeting #94bis Tdoc R1-1811490; Oct. 8-12, 2018; Chengdu, China.

International Search Report with Written Opinion dated Feb. 26, 2020; International Appln. No. PCT/KR2019/015550.

Samsung, "Procedures for UL Transmissions", 3GPP Draft, R1-1717665—Procedures for UL Transmission, 3rd Generation Partnership Project (3GPP), vol. RAN WG1, Prague, CZ, Oct. 9, 2017-Oct. 13, 2017, Oct. 8, 2017, XP051340850.

Vivo, "On UL data transmission procedure", 3GPP Draft, R1-1719796_on_UL Data Transmission Procedure_Final, 3rd Generation Partnership Project (3GPP), vol. RAN WG1, Reno, USA, Nov. 27, 2017-Dec. 1, 2017, Nov. 18, 2017, XP051369539.

Catt, "Grant-based and grant-free UL transmission procedures", 3GPP Draft, R1-1715827, 3rd Generation Partnership Project (3GPP), vol. RAN WG1, Nagoya, Japan, Sep. 18, 2017-Sep. 21, 2017, Sep. 17, 2017, XP051339287.

Extended European Search Report dated Nov. 26, 2021, issued in European Patent Application No. 19885753.4.

* cited by examiner

METHOD AND APPARATUS FOR TRANSMITTING DATA BASED ON GRANT FREE IN WIRELESS COMMUNICATION SYSTEM

CROSS-REFERENCE TO RELATED APPLICATION(S)

This application is based on and claims priority under 35 U.S.C. § 119(a) of a Korean patent application number 10-2018-0140226, filed on Nov. 14, 2018, in the Korean Intellectual Property Office, and of a Korean patent application number 10-2019-0013567, filed on Feb. 1, 2019, in the Korean Intellectual Property Office, the disclosure of each of which is incorporated by reference herein in its entirety.

BACKGROUND

1. Field

The disclosure relates to a wireless communication system. More particularly, the disclosure relates to a method and an apparatus for transmitting and receiving data based on grant free in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As described above, with the development of a wireless communication system, various services can be provided, and thus schemes for effectively providing such services have been demanded.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for efficiently activating or releasing a plurality of grant-free resources (downlink semi persistent scheduling (DL SPS) or uplink (UL) grant type 2) in a state where a terminal is configured with the respective grant-free resources for each cell and bandwidth part (BWP).

Additional aspects will be set forth in part in the description which follows and, in part, will be apparent from the description, or may be learned by practice of the presented embodiments.

In accordance with an aspect of the disclosure, a method performed by a terminal is provided. The method includes receiving, from a base station, downlink control information (DCI) including information on a hybrid automatic repeat request (HARQ) process number, identifying at least one grant free resource corresponding to the information on the HARQ process number, and releasing the at least one grant free resource based on the information.

In accordance with another aspect of the disclosure, a method performed by a base station is provided. The method includes identifying at least one grant free resource to be released, the at least one grant free resource being configured for a terminal, generating information on a hybrid automatic repeat request (HARQ) process number corresponding to the at least one grant free resource, and transmitting, to a terminal, downlink control information (DCI) including the information, wherein the at least one grant free resource is released based on the information.

In accordance with another aspect of the disclosure, a terminal is provided. The terminal includes a transceiver configured to transmit and receive a signal, and at least one processor configured to receive, from a base station, downlink control information (DCI) including information on a hybrid automatic repeat request (HARQ) process number, identify at least one grant free resource corresponding to the information on the HARQ process number, and release the at least one grant free resource based on the information.

In accordance with another aspect of the disclosure, a base station is provided. The base station includes a transceiver configured to transmit and receive a signal, and at least one processor configured to identify at least one grant free resource to be released, the at least one grant free resource being configured for a terminal, generate information on a hybrid automatic repeat request (HARQ) process number corresponding to the at least one grant free resource, and transmit, to a terminal, downlink control information (DCI) including the information, wherein the at least one grant free resource is released based on the information.

According to the embodiments of the disclosure, various services can be effectively provided by efficiently supporting activation and release of a plurality of grant-free resources configured in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description, taken in conjunction with the accompanying drawings, in which.

Throughout the drawings, it should be noted that like reference numbers are used to depict the same or similar elements, features, and structures.

DETAILED DESCRIPTION

Figure 1:
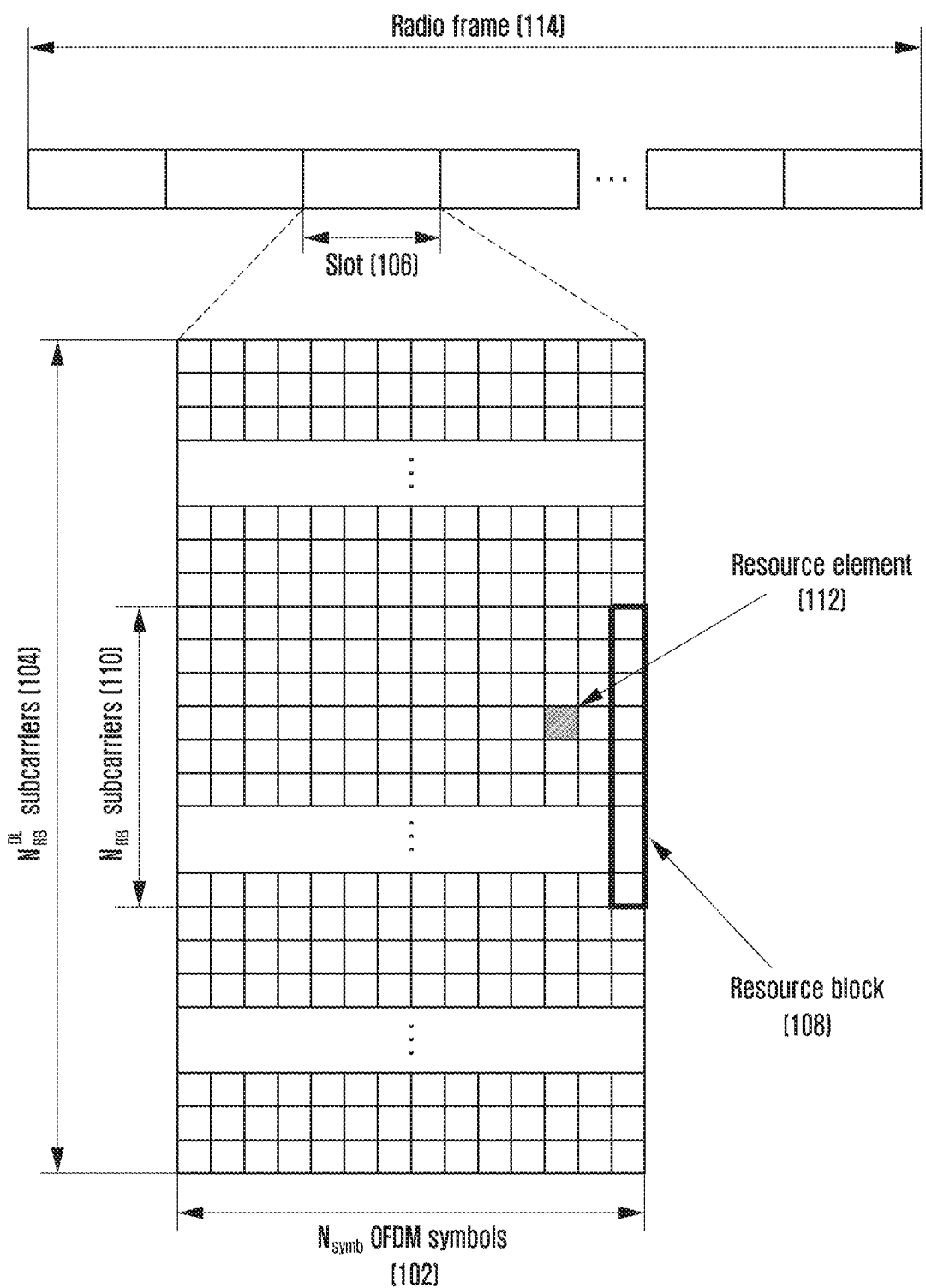
FIG. 1 is a diagram illustrating the structure of a time-frequency domain that is a radio resource region of a 5th generation (5G) or new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as field programmable gate array (FPGA) or application specific integrated circuit (ASIC), which performs certain tasks. However, "~unit" is not meant to be limited to software or hardware. The term "~unit" may advantageously be configured to reside on the addressable storage medium and configured to execute on one or more processors. Thus, "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing unit (CPU)s in a device or a security multimedia card. Further, in an embodiment, "~unit" may include one or more processors.

A wireless communication system was initially developed for the purpose of providing a voice-oriented service, but it has been expanded to, for example, a broadband wireless communication system that provides a high-speed and high-quality packet data service together with the communication standards, such as 3GPP high speed packet access (HSPA), long term evolution (LTE) or evolved universal terrestrial radio access (E-UTRA), LTE-Advanced (LTE-A), 3GPP2 high rate packet data (HRPD), ultra-mobile broadband (UMB), and institute of electrical and electronics engineers (IEEE) 802.16e. Also, for the 5th generation wireless communication system, 5th generation (5G) or new radio (NR) communication standards have been developed.

In the 5G or NR system that is a representative example of broadband wireless communication systems, the downlink (DL) and uplink (UL) adopt orthogonal frequency division multiplexing (OFDM) schemes. More specifically, the downlink adopts a cyclic-prefix OFDM (CP-OFDM) scheme, and the uplink (UL) adopts a discrete Fourier transform spreading OFDM (DFT-S-OFDM) scheme in addition to the CP-OFDM.

The uplink means a radio link in which a terminal (or user equipment (UE) or mobile station (MS)) transmits data or a control signal to a base station (or gNodeB, eNode B, or base station (BS)), and the downlink means a radio link in which the base station transmits data or a control signal to the terminal. Such a multi-access scheme may discriminate data or control information of respective users from each other by allocating and operating time-frequency resources on which the data or control information of the respective users is to be carried so that the time-frequency resources do not overlap each other, that is, so as to establish orthogonality.

The 5G or NR system adopts a hybrid automatic repeat request (HARQ) scheme in which a physical layer retransmits the corresponding data if decoding failure occurs during an initial transmission. According to the HARQ scheme, a receiver may transmit information (negative acknowledgement (NACK)) for notifying a transmitter of the decoding failure if the receiver has not accurately decoded the data, and the transmitter may make a physical layer retransmit the corresponding data. The receiver may combine the data that is retransmitted by the transmitter with the previous data of which the decoding has failed to heighten the data reception performance. Further, if the receiver has accurately decoded the data, the HARQ scheme may transmit information (acknowledgement (ACK)) for notifying of a decoding success to the transmitter, so that the transmitter can transmit new data.

Meanwhile, the NR system that is the new 5G communication has been designed so that various services can be freely multiplexed on time and frequency resources, and thus waveform/numerology and reference signals are dynamically or freely allocated as needed for corresponding services. In order to provide optimum services to the terminal in wireless communications, it is important to optimize the data transmission through measurement of the channel quality and the interference amount, and thus it is essential to measure an accurate channel state. However, in the case of the 5G or NR channels, in contrast with the 4th generation (4G) communication in which the channel and interference characteristics are not greatly changed in accordance with the frequency resources, the channel and interference characteristics are greatly changed in accordance with the services, and thus it is necessary to support a subset of a frequency resource group (FRG) level that makes it possible to dividedly measure the channel state.

In the 5G or NR system, supported services may be divided into categories of an enhanced mobile broadband (eMBB), massive machine type communications (mMTC), and ultra-reliable and low-latency communications (URLLC). The eMBB is a service aimed at high-speed transmission of high-capacity data, the mMTC is a service aimed at minimization of a terminal power and accesses of a plurality of terminals, and the URLLC is a service aimed at high reliability and low latency. Different requirements may be applied in accordance with the kind of services applied to the terminal.

Among the above-described services, the URLLC service is aimed at high reliability and low latency, and thus it may be necessary to transmit control information and data information, which may be transmitted on a physical channel, at a low coding rate. In the case of the control information, iterative transmission of the control information has been introduced in the LTE MTC or narrow band Internet-of-things (NB-IoT) services. The purpose of such introduction is to provide a high coverage for terminals having low bandwidths, and thus latency has not been fully considered. Further, the minimum unit of the iterative transmission of the control information is fixed to the unit of a subframe based on the LTE. Accordingly, in order to support the URLLC service in the NR or 5G system, it is necessary to introduce an iterative transmission mode of control information, which can improve reliability while requiring low latency.

Accordingly, in the disclosure, a situation in which control information is iteratively transmitted within a slot is basically considered. In addition, a situation in which control information that may be transmitted over the slot boundary is iteratively transmitted is also under consideration. Through operations provided in the disclosure, it is possible for a terminal to detect control information that is transmitted from a base station at an earlier time with high reliability.

All terms used in the description have been defined in consideration of their respective functions, but they may differ depending on intentions of a user or operator, or customs. Accordingly, they should be defined on the basis of the contents of the whole description of the disclosure. Hereinafter, a base station is the subject that performs resource allocation to a terminal, and it may be at least one of gNode B (gNB), eNode B (eNB), Node B, base station (BS), radio access unit, base station controller or at least one processor, or node on a network. A terminal may include user equipment (UE), mobile station (MS), cellular phone, smart phone, computer, or multimedia system that can perform a communication function. In the disclosure, a downlink (DL) is a radio transmission path of a signal that is transmitted from the base station to the terminal, and an uplink (UL) means a radio transmission path of a signal that is transmitted from the terminal to the base station. Hereinafter, although the NR system is exemplified in the disclosure, the disclosure is not limited thereto, but embodiments of the disclosure can be applied to even various communication systems having similar technical backgrounds or channel types. Further, the embodiments of the disclosure may also be applied to other communication systems through partial modifications thereof in a range that does not greatly deviate from the scope of the disclosure through the judgment of those skilled in the art.

In the disclosure, terms in the related art "physical channel" and "signal" may be interchangeably used with "data" or "control signal". For example, a physical downlink shared channel (PDSCH) is a physical channel on which data is transmitted, but in the disclosure, PDSCH may be referred to as data (or downlink data).

In the disclosure, higher signaling is a method for transferring a signal from the base station to the terminal using a downlink data channel of the physical layer, or transferring a signal from the terminal to the base station using an uplink data channel of the physical layer, and it may be mentioned as radio resource control (RRC) signaling or a medium access control (MAC) control element (CE).

Recently, as researches for the next generation communication system are in progress, various schemes for scheduling communication with a terminal have been discussed. Accordingly, efficient scheduling and data transmission/reception schemes in consideration of the characteristics of the next generation communication system have been demanded. Accordingly, in order to provide a plurality of services to a user in the communication system, a method capable of providing respective services to suit the features of the corresponding services at the same time interval and an apparatus using the method have been demanded.

In order to transmit or receive data to or from the base station, the terminal should receive separate control information from the base station. However, in the case of a service type that requires periodically occurring traffics or low-latency/high-reliability, it may be possible to transmit or receive the data without the separate control information. In the disclosure, such a transmission scheme is called a configured grant or grant-free based data transmission method.

It may be considered that a method by a terminal for receiving or transmitting data after configuration of a data transmission resource configured through control information and reception of related information is of a first signal transmission/reception type, and a method by a terminal for transmitting or receiving data based on preconfigured information without control information is of a second signal transmission/reception type. According to the second signal transmission/reception type, preconfigured resource regions exist periodically, and in the regions, UL type 1 grant that is a method configured only by a higher signal and UL type 2 grant (or SPS) that is a method configured by a combination of the higher signal and L1 signal. In the case of the UL type 2 grant (or SPS), partial information required by the terminal is determined by the higher signal, and whether to transmit other actual data is determined by the L1 signal. Here, the L1 signal is briefly divided into a signal indicating activation of a resource configured by the higher signal and a signal indicating release of the activated resource. In the disclosure, a method for activating or releasing the resource through the L1 signal if one or more resources configured by the higher signal exist.

FIG. 1 is a diagram illustrating the structure of a time-frequency domain that is a radio resource region of a 5G or NR system according to an embodiment of the disclosure.

Referring to FIG. 1, in a radio resource region, a horizontal axis represents a time domain, and a vertical axis represents a frequency domain. In the time domain, the minimum transmission unit is an OFDM symbol, and $N_{symb}$ OFDM symbols 102 constitute one 106. The length of the subframe may be defined as 1.0 ms, and a radio frame 114 may be defined as 10 ms. In the frequency domain, the minimum transmission unit is a subcarrier, and the transmission bandwidth of the whole system may be composed of $N_{BW}$ subcarriers 104 in total. However, such numerical values may be variably applied in accordance with the system.

The basic unit of the time-frequency resource region is a resource element (hereinafter, RE) 112 that may be expressed by an OFDM symbol index and a subcarrier index. A resource block (hereinafter, RB) 108 or a physical resource block (hereinafter, PRB) may be defined by $N_{symb}$ successive OFDM symbols 102 in the time domain and $N_{RB}$ successive subcarriers 110 in the frequency domain. Accordingly, one RB 108 may be composed of $N_{symb} \times N_{RB}$ REs 112.

In general, the minimum transmission unit of data is RB. In the 5G or NR system, it is general that $N_{symb}=14$ and $N_{RB}=12$, and $N_{BW}$ and $N_{RB}$ may be in proportion to the bandwidth of the system transmission band. The data rate is increased in proportion to the number of RBs that are scheduled to the terminal. In the case of a frequency division duplex (FDD) system that operates to discriminate a downlink and an uplink by means of frequency in the 5G or NR system, the downlink transmission bandwidth and the uplink transmission bandwidth may differ from each other. A channel bandwidth presents a RF bandwidth that corresponds to the system transmission bandwidth. Table 1 below presents the corresponding relationship between the system transmission bandwidth that is defined by an LTE system that is the 4th wireless communication system before the 5G or NR system. For example, the LTE system having 10 MHz channel bandwidth may have the transmission bandwidth that is composed of 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

The 5G or NR system may operate in a channel bandwidth that is wider than the channel bandwidth of the LTE as presented in Table 1. Table 2 presents the corresponding relationship among a system transmission bandwidth, channel bandwidth, and subcarrier spacing (SCS) in the 5G or NR system.

TABLE 2

| SCS | Channel bandwidth $BW_{Channel}$ [MHz] | | | | | | | | | |
|---|---|---|---|---|---|---|---|---|---|---|
| [kHz] | 5 | 10 | 15 | 20 | 25 | 40 | 50 | 60 | 80 | 100 |
| Maximum Transmission bandwidth $N_{RB}$ | | | | | | | | | | |
| 15 | 25 | 52 | 79 | 106 | 133 | 216 | 270 | N.A. | N.A. | N.A. |
| 30 | 11 | 24 | 38 | 51 | 65 | 106 | 133 | 162 | 217 | 273 |
| 60 | N.A. | 11 | 18 | 24 | 31 | 51 | 65 | 79 | 107 | 135 |

In the 5G or NR system, scheduling information on downlink data or uplink data is transferred from the base station to the terminal through downlink control Information (DCI). The DCI may be defined in accordance with various formats, and it may indicate whether the DCI is scheduling information on uplink data (UL grant) or scheduling information on downlink data (DL grant) according to each format, whether the DCI is compact DCI having a small size of control information, whether spatial multiplexing using multiple antennas is applied, and whether the DCI is a DCI for power control. For example, DCI format 1-1 that is the scheduling control information on the downlink data (DL grant) may include at least one piece of the following control information.

Carrier indicator: This indicates on what frequency carrier the corresponding DCI is transmitted.

DCI format indicator: This is an indicator discriminating whether the corresponding DCI is for a downlink or an uplink.

Bandwidth part (hereinafter, BWP) indicator: This indicates from what BWP the corresponding DCI is transmitted.

Frequency domain resource assignment: This indicates the RB of the frequency domain allocated to the data transmission. An expressed resource is determined in accordance with the system bandwidth and resource allocation scheme.

Time domain resource assignment: This indicates from what OFDM symbol of what slot a data related channel is transmitted.

VRB-to-PRB mapping: This indicates in what scheme a virtual RB (hereinafter, VRB) index and a physical RB (hereinafter, PRB) index are mapped on each other.

Modulation and coding scheme (hereinafter, MCS): This indicates a modulation scheme and a coding rate used for data transmission. That is, this may indicate information on whether the modulation is quadrature phase shift keying (QSK), 16 quadrature amplitude modulation (QAM), 64 QAM, or 256 QAM and a coding rate value capable of notifying of a transport block size (TBS) and channel coding information.

Codeblock group (CBG) transmission information: This indicates information on what CBG is to be transmitted if retransmission is configured.

HARQ process number: This indicates a process number of HARQ.

New data indicator: This indicates whether HARQ is initially transmitted or retransmitted.

Redundancy version: This indicates a redundancy version of HARQ.

Transmit power control (TCP) command for a physical uplink control channel (PUCCH): This indicates a transmission power control command for PUCCH that is an uplink control channel.

In the case of the physical uplink channel (PUSCH) transmission as described above, the time domain resource assignment may be transferred by information on a slot in which the PUSCH is transmitted, start OFDM symbol location S in the corresponding slot, and the number L of OFDM symbols on which the PUSCH is mapped. The above-described S may be a relative location from the start of the slot, L may be the number of successive OFDM symbols, and S and L may be determined by a start and length indicator value (SLIV) defined as in Equation (1) below.

If $(L-1) \leq 7$ then $SLIV = 14*(L-1)+S$ else $SLIV = 14*(14-L+1)+(14-1-S)$ where $0 < L \leq 14-S$      Equation (1)

Generally, in the 5G or NR system, it is possible to be configured with a table in which information on the SLIV value, the PUSCH mapping type, and the PUSCH transmission slot is included in one row through RRC configuration. Thereafter, in the time domain resource assignment of the DCI, the base station can transfer the information on the SLIV value, the PUSCH mapping type, and the PUSCH transmission slot to the terminal by indicating index values in the configured table.

In the 5G or NR system, as the PUSCH mapping type, type A and type B are defined. According to the PUSCH mapping type A, the first OFDM symbol of demodulation reference signal (DMRS) OFDM symbols is located in the second or third OFDM symbol in the slot. According to the PUSCH mapping type B, the first OFDM symbol of the DMRS OFDM symbols is located in the first OFDM symbol on the time domain resource allocated through PUSCH transmission. The PUSCH time domain resource allocation method as described above may be equally applied to the PDSCH time domain resource allocation.

The DCI may pass through a channel coding and modulation process, and it may be transmitted on a physical downlink control channel (PUCCH) that is a downlink physical control channel (or control information, hereinafter, interchangeably used with each other).

In general, the DCI is scrambled with a specific radio network temporary identifier (RNTI) (or terminal identifier) independently of respective terminals to be added with a cyclic redundancy check (CRC), is channel-coded, and then is configured as independent PDCCHs to be transmitted. The PDCCH is mapped onto a control resource set (CORESET) configured to the terminal to be transmitted.

The downlink data may be transmitted on a physical downlink shared channel (PDSCH) that is a physical channel for downlink data transmission. The PDSCH may be transmitted after a control channel transmission interval, and scheduling information, such as detailed mapping location and modulation scheme, is determined based on the DCI being transmitted through the PDCCH.

Through the MCS of the control information constituting the DCI, the base station notifies the terminal of a modulation scheme applied to the PDSCH intended to be transmitted to the terminal and the size of data (TBS) intended to be transmitted. In one embodiment, the MCS may be composed of 5 bits or more or less. The TBS corresponds to the size of the data (transport block (hereinafter, TB)) that the base station intends to transmit before the channel coding for error correction is applied thereto.

In the disclosure, the transport block (hereinafter, TB) may include a MAC header, a MAC control element (CE), one or more MAC service data units (SDUs), and padding bits. Further, the TB may indicate a data unit that gets down from the MAC layer to the physical layer or a protocol data unit (PDU).

The modulation scheme that is supported in the 5G or NR system may be quadrature phase shift keying (QPSK), 16 quadrature amplitude modulation (16 QAM), 64 QAM, and 256 QAM, and respective modulation orders Qm correspond to 2, 4, 6, and 8. That is, in the case of QPSK modulation, 2 bits per symbol may be transmitted, and in the case of 16 QAM, 4 bits per OFDM symbol may be transmitted. Further, in the case of 64 QAM, 6 bits per symbol may be transmitted, and in the case of 256 QAM, 8 bits per symbol may be transmitted.

In the 5G or NR system, in the case of indicating a time resource allocation field index m included in the DCI when the terminal is scheduled with the PDSCH or PUSCH by the DCI, this indicates a combination of DRMS type A position information corresponding to m+1, PDSCH mapping type information, slot index K0, data resource start symbol S, and data resource allocation length L in the table indicating time domain resource allocation information. As an example, Table 3 is a table including time domain resource allocation information.

TABLE 3

PDSCH time domain resource allocation based on normal cyclic prefix

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2,3 | Type B | 0 | 5 | 7 |

TABLE 3-continued

PDSCH time domain resource allocation based on normal cyclic prefix

| Row index | dmrs-TypeA-Position | PDSCH mapping type | $K_0$ | S | L |
|---|---|---|---|---|---|
| 9 | 2,3 | Type B | 0 | 5 | 2 |
| 10 | 2,3 | Type B | 0 | 9 | 2 |
| 11 | 2,3 | Type B | 0 | 12 | 2 |
| 12 | 2,3 | Type A | 0 | 1 | 13 |
| 13 | 2,3 | Type A | 0 | 1 | 6 |
| 14 | 2,3 | Type A | 0 | 2 | 4 |
| 15 | 2,3 | Type B | 0 | 4 | 7 |
| 16 | 2,3 | Type B | 0 | 8 | 4 |

In Table 3, dmrs-typeA-Position denotes a field notifying of a symbol location in which DMRS is transmitted in one slot indicated by a system information block (SIB) that is one piece of terminal common control information. A possible value of the corresponding field is 2 or 3. If it is assumed that the number of symbols that constitute one slot is 14 in total, and the first symbol index is "0", "2" means the third symbol, and "3" means the fourth symbol.

In Table 3, PDSCH mapping type denotes information notifying of the DMRS location in a scheduled data resource region. If the PDSCH mapping type is "A", the DMRS is always transmitted or received in the symbol location determined by dmrs-typeA-Position regardless of the allocated data time domain resources. If the PDSCH mapping type is "B", the DMRS is always transmitted or received in the first symbol of the allocated data time domain resources that is the DMRS location. In other words, the PDSCH mapping type B does not use dmrs-typeA-Position information. In Table 3, $K_0$ means an offset between a slot index to which the PDCCH on which the DCI is transmitted belongs and a slot index to which scheduled PDSCH or PUSCH belongs in the corresponding DCI. As an example, if the slot index of the PDCCH is "n", the slot index of the PDSCH or PUSCH scheduled by the DCI of the PDCCH is n+$K_0$. In Table 3, S means a start symbol index of the data time domain resources in one slot. The possible S value is in the range of 0 to 10 based on the normal cyclic prefix.

In Table 3, L means the length of the data time domain resource interval in one slot. The possible L value is in the range of 1 to 14. However, the possible S and L values are determined by the following mathematical expression 1, Table 4, and Table 5. Table 3 may present default values used by the terminal before the terminal receives the time resource allocation information through terminal-specific or terminal-common higher signaling. As an example, the DCI format 0_0 or 1_0 may always use Table 3 as default time resource region values.

Table 3 presents PDSCH time domain resource allocation values, and in order to allocate the PUSCH time domain resource, the value K1 is used in replacement of K2. Table 3-1 below is an example of a PUSCH time domain resource allocation table.

TABLE 3-1

Normal cyclic prefix based PDSCH time domain resource allocation

| Row index | PUSCH mapping type | $K_2$ | S | L |
|---|---|---|---|---|
| 1 | Type A | j | 0 | 14 |
| 2 | Type A | j | 0 | 12 |

TABLE 3-1-continued

Normal cyclic prefix based PDSCH time
domain resource allocation

| Row index | PUSCH mapping type | $K_2$ | S | L |
|---|---|---|---|---|
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Table 4 below is a table presenting combinations of possible S and L depending on whether the cyclic prefix is normal or extended and whether the PDSCH mapping type is type A or type B.

TABLE 4

Combination of S and L to which PDSCH time domain resource can be allocated

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicabie only if dmrs-TypeA-Position = 3

Table 5 below is a table presenting combinations of possible S and L depending on whether the cyclic prefix is normal or extended and whether the PUSCH mapping type is type A or type B.

TABLE 5

Combination of S and L to which PUSCH time domain resource can be allocated

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} | {0, . . . , 12} | {1, . . . , 12} | {1, . . . , 12} |

In Table 3, it may be possible to configure respective indexes through higher signaling parameter PDSCH-TimeDomain ResourceAllocationList or PUSCH-TimeDomain-ResourceAllocationList.

PDSCH-TimeDomainResourceAllocationList is composed of one or a plurality of higher signaling parameter PDSCH-TimeDomainResourceAllocation, and in the PDSCH-TimeDomainResourceAllocation, k0, mapping-type, and startSymbolAndLength exist. A possible value of k0 is in the range of 0 to 32. Type A or type B may correspond to mappingtype. The possible value of StartSymbolAndLength is in the range of 0 to 127. As described above, if mappingtype is type A, the DMRS symbol location follows the value indicated in dmrs-typeA-Position.

PUSCH-TimeDomainResourceAllocationList is composed of one or a plurality of higher signaling parameter PUSCH-TimeDomainResourceAllocations, and in the PUSCH-TimeDomainResourceAllocation, k0, mapping type, and startSymbolAndLength exist. The possible value of k0 is in the range of 0 to 32. Type A or type B may correspond to mappingtype. The possible value of startSymbolAndLength is in the range of 0 to 127. As described above, if mappingtype is type A, the DMRS symbol location follows the value indicated in dmrs-typeA-Position.

The above-described PDSCH-TimeDomainResourceAllocation or PUSCH-TimeDomainResource Allocation is a PDSCH or PUSCH time domain resource allocation method in one slot. The higher signaling aggregationFactorDL means the number of slots in which PDSCH-TimeDomain-ResourceAllocation values applied in one slot are iteratively transmitted. The higher signaling aggregationFactorUL means the number of slots in which PUSCH-TimeDomain-ResourceAllocation values applied in one slot are iteratively transmitted. The range of possible values of aggregation-FactorDL and aggregationFactorUL is {1,2,4,8}. As an example, if aggregationFactorDL is 8, it means that one value of possible PDSCH-TimeDomainResourceAlloca-tions is iteratively transmitted through 8 slots in total. However, in a specific slot, if at least parts of symbols applied to PDSCH-TimeDomainResourceAllocation are uplink symbols, the PDSCH transmission/reception of the corresponding slot is omitted. In a similar manner, if at least parts of symbols applied to PUSCH-TimeDomainResourceAllocation are downlink symbols in a specific slot, the PUSCH transmission/reception of the corresponding slot is omitted.

Figure 2:
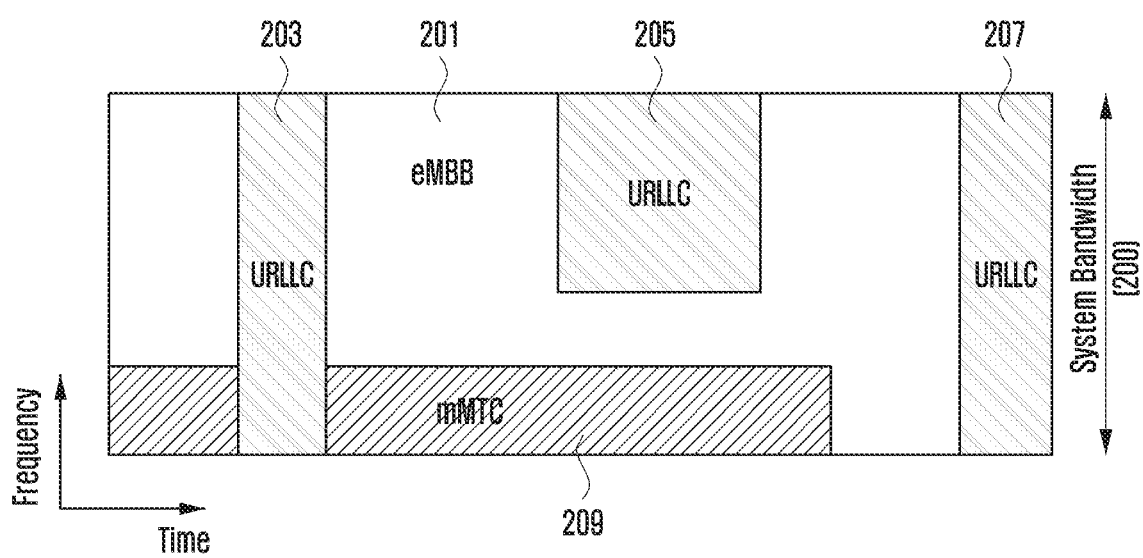
FIG. 2 is a diagram explaining a method for allocating data of various services in a time-frequency resource region in a 5G or NR system according to an embodiment of the disclosure.

FIG. 2 is a diagram explaining a method for allocating data of various services in a time-frequency resource region in a 5G or NR system according to an embodiment of the disclosure.

Referring to FIG. 2, in a whole system frequency band 200, data for eMBB, URLLC, and mMTC may be allocated. If URLLC data 203, 205, and 207 are generated while eMBB 201 and mMTC 209 are allocated and transmitted in a specific frequency band, and transmission of the generated URLLC data is necessary, it is possible to transmit the URLLC data 203, 205, and 207 without emptying a portion in which the eMBB 201 and the mMTC 209 have already been allocated or without transmitting the eMBB 201 and the mMTC 209. Because it is necessary to reduce the latency of the URLLC during the above-described services, the URLLC data may be allocated to a portion of the resource allocated to the eMBB or mMTC to be transmitted. If the URLLC is additionally allocated to the eMBB-allocated resource to be transmitted, eMBB data may not be transmitted in the redundant time-frequency resources, and thus transmission performance of the eMBB data may be lowered. That is, an eMBB data transmission failure due to the URLLC allocation may occur.

Figure 3:
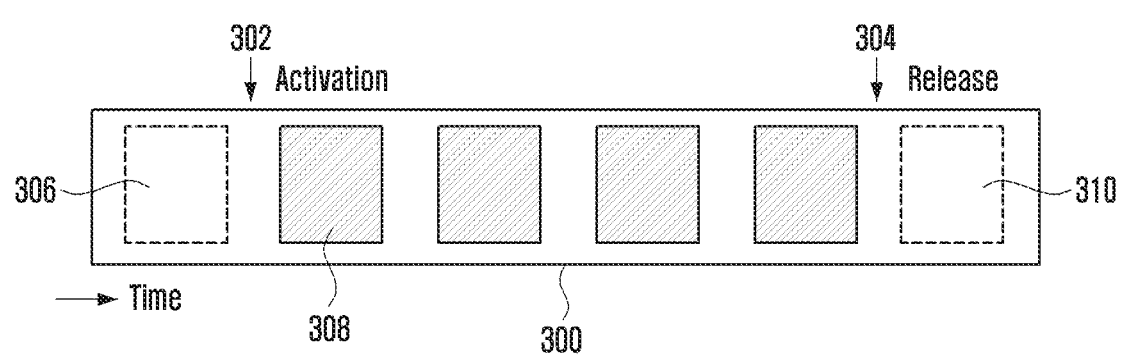
FIG. 3 is a diagram explaining a grant-free transmission and reception operation according to an embodiment of the disclosure.

FIG. 3 is a diagram explaining a grant-free transmission and reception operation according to an embodiment of the disclosure.

In a first signal transmission/reception type, a terminal receives DCI from a base station, and it performs downlink data reception or uplink data transmission in accordance with transmission configuration information indicated by the corresponding DCI. In a second signal transmission/reception type, the terminal performs the downlink data reception or uplink data transmission in accordance with information preconfigured by a higher signal without receiving the DCI. In the disclosure, the terminal operation method for the second signal transmission/reception type will be mainly described. In the disclosure, an SPS that is the second signal type for receiving the downlink data means grant-free based PDSCH transmission and reception in the downlink, and UL grant type that is the second signal type for transmitting the uplink data means grant-free based PUSCH transmission and reception in the uplink. The UL grant type includes UL grant type 1 in which the whole grant-free based PUSCH related configuration information is received only through the higher signal, and UL grant type 2 in which the whole grant-free based PUSCH related configuration information is received through the higher signal and DCI signal. Specifically, in the UL grant type 1, the terminal can perform the grant-free based PUSCH transmission only through higher signal configuration without receiving the DCI, whereas in the UL grant type 2, the terminal can perform the grant-free based PUSCH transmission through the DCI reception after receiving the higher signal configuration. For reference, the downlink semi persistent scheduling (DL SPS) enables the terminal to receive the grant-free based PDSCH transmission through the higher signal configuration and additional configuration information indicated by the DCI in a similar manner as the UL grant type 2.

The DL SPS means downlink semi-persistent scheduling, and it corresponds to a method by the base station for periodically transmitting and receiving downlink data information to and from the terminal based on the information configured through the higher signaling without specific downlink control information scheduling. The DL SPS is applicable in a VoIP or traffic situation that occurs periodically. Further, although the resource configuration for the DL SPS is periodic, actually generated data may be aperiodic. In this case, the terminal does not know whether data is actually generated on the periodically configured resource, and thus it may be possible to perform the following types of operations.

Method 1: With respect to the periodically configured DL SPS resource region, the terminal transmits HARQ-ACK information to the base station with respect to the uplink resource region corresponding to the corresponding resource region with respect to the result of demodulation/decoding of the received data.

Method 2: With respect to the periodically configured DL SPS resource region, the terminal transmits HARQ-ACK information to the base station with respect to the uplink resource region corresponding to the corresponding resource region with respect to the result of demodulation/decoding of the received data if at least signal detection with respect to the DMRS or data has successfully been performed.

Method 3: If decoding/demodulation has succeeded with respect to the periodically configured DL SPS resource region (i.e., ACK occurrence), the terminal transmits HARQ-ACK information to the base station with respect to the uplink resource region corresponding to the corresponding resource region with respect to the result of demodulation/decoding of the received data.

In method 1, even if the base station does not actually transmit the downlink data with respect to the DL SPS resource region, the terminal always transmits the HARQ-ACK information to the uplink resource region corresponding to the corresponding DL SPS resource region. In method 2, because the terminal does not know when the base station transmits data to the DL SPS resource region, it may be possible for the terminal to transmit the HARQ-ACK information in a situation in which the terminal knows whether to transmit/receive the data, such as in a situation in which the terminal has succeeded in the DMRS detection or in the CRC detection. In method 3, only in the case where the terminal has succeeded in the data demodulation/decoding, the terminal transmits the HARQ-ACK information to the uplink resource region corresponding to the corresponding DL SPS resource region.

Among the above-described methods, it may be possible for the terminal to support only one or two or more methods. It may be possible to select one of the above-described methods through the standard or the higher signal. As an example, if method 1 is indicated through the higher signal, it may be possible for the terminal to perform the HARQ-ACK information with respect to the corresponding DL SPS based on method 1. Further, it may also be possible to select one method in accordance with the DL SPS higher configuration information. As an example, if the transmission period is equal to or larger than n slots in the DL SPS higher configuration information, the terminal may apply method 1, and in contrast, it may be possible for the terminal to apply method 3. In the disclosure, although the transmission period has been exemplified, it may be sufficiently possible to apply the method through an applied MCS table, DMRS configuration information, or the higher signaling.

The terminal performs downlink data reception in the downlink resource region configured through the higher signaling. It may be possible to activate or release, through L1 signaling, the downlink resource region configured through the higher signaling.

The UL grant type 2 or UL grant type 1 is a method by the base station for transmitting and receiving uplink data information periodically or aperiodically to and from the terminal in the periodically configured uplink resource region based on the information configured through the higher signaling without scheduling specific downlink control information. The terminal transmits the uplink data in the uplink resource region configured through the higher signaling. It may be possible to activate or release, through L1 signaling, the uplink resource region configured through the higher signaling. The corresponding method is called UL grant type 2. In contrast, the UL grant type 1 is a method in which it is possible for the terminal to determine that the uplink resource region configured through the higher signaling without separate L1 signaling has been activated.

FIG. 3 illustrates an operation for the DL SPS or UL grant type 2. The terminal receives grant-free based UL grant type 2 configuration information from the base station through the following higher signals.

frequencyHopping: A field notifying whether the frequency hopping is intra-slot hopping or inter-slot hopping. If this field does not exist, the frequency hopping is deactivated.

cg-DMRS-Configuration: DMRS configuration information.

mcs-Table: A field notifying whether to use 256 QAM MCS table or new 64 QAM MCS table during PUSCH transmission without transform precoding. If this field does not exist, the 64 QAM MCS table is used.

mcs-TableTransformPrecoder: A field notifying of the MCS table used by the terminal during transform precoding based PUSCH transmission. If this field does not exist, the 64 QAM MCS table is used.

uci-OnPUSCH: One of dynamic or semi-static schemes. Betta-offset is applied thereto.

resourceAllocation: This is to configure whether the resource allocation type is 1 or 2.

rbg-Size: This is to determine one of two configurable RBG sizes.

powerControlLoopToUse: This is to determine whether to apply a closed loop power control.

p0-PUSCH-Alpha: This is to apply Po, PUSCH alpha values.

transformPrecoder: This is to configure whether to apply transformer precoding. If this field does not exist, msg3 configuration information follows.

nrofHARQ-Processes: The number of configured HARQ processes.

repK: The number of times of iterative transmission.

repK-RV: An RV pattern applied to each iterative transmission during the iterative transmission. If the number of times of iterative transmission is 1, this field is deactivated.

periodicity: A transmission period that exists from minimally two symbols up to maximally 640 to 5120 slot units according to the subcarrier spacing.

The terminal determines UL grant type 2 configuration information in additional consideration of the following information of the DCI that activates UL grant type 2 in addition to the UL grant type 2.

timeDomainAllocation: A field notifying of a PUSCH transmission time resource region. The value K2 indicates slot offset information for starting the UL grant type 2 transmission based on a slot in which the DCI is transmitted.

frequencyDomainAllocation: A field notifying of PUSCH transmission frequency resource region.

antennaPort: Antenna port configuration information applied to the grant-free PUSCH transmission.

dmrs-SeqInitialization: A field configured when the transform precoder is deactivated.

precodingAndNumberOfLayers.

srs-ResourceIndicator: A field notifying of SRS resource configuration information.

mcsAndTBS: MCS and TBS applied to PUSCH transmission.

frequencyHoppingOffset: A frequencyhoppingoffset value.

pathlossReferenceIndex.

The above-described configuration information is indicated through DCI in UL grant type 2, but in the case of UL grant type 1 supporting grant-free PUSCH without DCI activation, the above-described information and timeDomainOffset information are configured through a higher signal. The terminal receives grant-free based UL grant type 2 configuration information from the base station through the following higher signals.

The terminal configures the following DL SPS configuration information from a higher signal.

Periodicity: A DL SPS transmission period.

nrofHARQ-Processes: The number of HARQ processes configured for DL SPS.

n1PUCCH-AN: HARQ resource configuration information for DL SPS.

mcs-Table: MCS table configuration information applied to DL SPS.

In the disclosure, DL SPS and UL grant type configuration information may be configured for each primary cell (Pcell) or secondary cell (Scell), and it may also be configured for each bandwidth part (BWP). Further, it may also be possible to configure one or more DL SPS or UL grant types for each specific cell or BWP.

Referring to FIG. 3, the terminal determines grant-free transmission/reception configuration information 300 through the higher signal reception for the DL SPS or UL grant type. The UL grant type 1 performs uplink data transmission or downlink data reception on the corresponding resource without separate DCI based activation/release. The DL SPS or UL grant type 2 may be able to perform data transmission/reception with respect to a resource region 308 configured after receiving the DCI 302 indicating activation, and it is unable to perform data transmission/reception with respect to a resource region 306 before receiving the corresponding DCI. Further, the terminal is unable to perform data transmission/reception with respect to the resource region 310 after receiving the DCI 304 indicating release.

If the following two kinds of conditions are all satisfied for SPS or UL grant type 2 scheduling activation or release, the terminal verifies DL SPS assignment PDCCH or configured UL grant type 2 PDCCH.

Condition 1: A case where a CRC bit of a DCI format transmitted on the PDCCH is scrambled with CS-RNTI configured through higher signaling.

Condition 2: A case where a new data indicator (NDI) field for an activated transport block is configured to 0.

If a part of a field configuring a DCI format being transmitted on the DL SPS assignment PDCCH or configured UL grant type 2 PDCCH is equal to that presented in Table 6 and Table 7, the terminal determines that information in the DCI format is effective activation or effective release of the DL SPS or UL grant type 2. As an example, if the DCI format including the information presented in Table 6 is detected, the terminal determines that the DL SPS or UL grant type 2 has been activated. As another example, if the DCI format including the information presented in Table 7 is detected, the terminal determines that the DL SPS or UL grant type 2 has been released.

If the part of the field configuring the DCI format being transmitted on the DL SPS assignment PDCCH or configured UL grant type 2 PDCCH is not equal to that presented in Table 6 and Table 7, the terminal determines that the DCI format is detected through unmatched CRC.

TABLE 6

Special field configuration information for activation of DL SPS and UL grant type 2

|  | DCI format 0_0/0_1 | DCI format 1_0 | DC format 1_1 |
|---|---|---|---|
| HARQ process number | set to all '0's | set to all '0's | set to all '0's |
| Redundancy version | set to '00' | set to '00' | For the enabled transportion block: set to '00' |

TABLE 7

Special field configuration information for release of DL SPS and UL grant type 2

|  | DCI format 0_0 | DCI format 1_0 |
|---|---|---|
| HARQ process number | set to all '0's | set to all '0's |
| Redundancy version | set to '00' | set to '00' |
| Modulation and coding scheme | set a all '1's | set to all '1's |
| Resource block assignment | set to all '1's | set to all '1's |

If the PDSCH is received without PDCCH reception or the PDCCH indicating SPS PDSCH release is received, the terminal generates a corresponding HARQ-ACK information bit. Further, the terminal does not expect to transmit HARQ-ACK information for receiving two or more SPS PDSCHs on one PUCCH resource. In other words, the terminal includes only HARQ-ACK information for one SPS PDSCH reception on one PUCCH resource.

The DL SPS may be configured even in PCell and SCell. Parameters that can be configured through DL SPS higher signaling are as follows.

Periodicity: A DL SPS transmission period.

nrofHARQ-processes: The number of HARQ processes that can be configured for DL SPS.

n1PUCCH-AN: A HARQ resource configuration for DL SPS. The base station configures the resource on PUCCH format 0 or 1.

The above-described Table 6 and Table 7 present a field that is possible in a situation in which only one DL SPS or UL grant type 2 is configured for each cell and for each BWP. The DCI fields for activating (or releasing) respective DL SPS resources or UL grant type 2 resources in a situation in which a plurality of DL SPS or UL grant type 2 are configured for each cell and for each BWP may differ. In the disclosure, a method for solving such a situation is provided.

In the disclosure, all DCI formats as described above in Table 6 and Table 7 are not used to activate or release respective DL SPS or UL grant type 2 resources. For example, DCI format 0_0 and DCI format 0_1 used for scheduling the PUSCH are used to activate the UL grant type 2 resource, and DCI format 1_0 and DCI format 1_1 used for scheduling the PDSCH are used to activate the DL SPS resource. For example, the DCI format 0_0 used for scheduling the PUSCH is used for the purpose of releasing the UL grant type 2 resources, and the DCI format 1_0 used for scheduling the PDSCH is used for the purpose of releasing the DL SPS resource.

Figure 4:
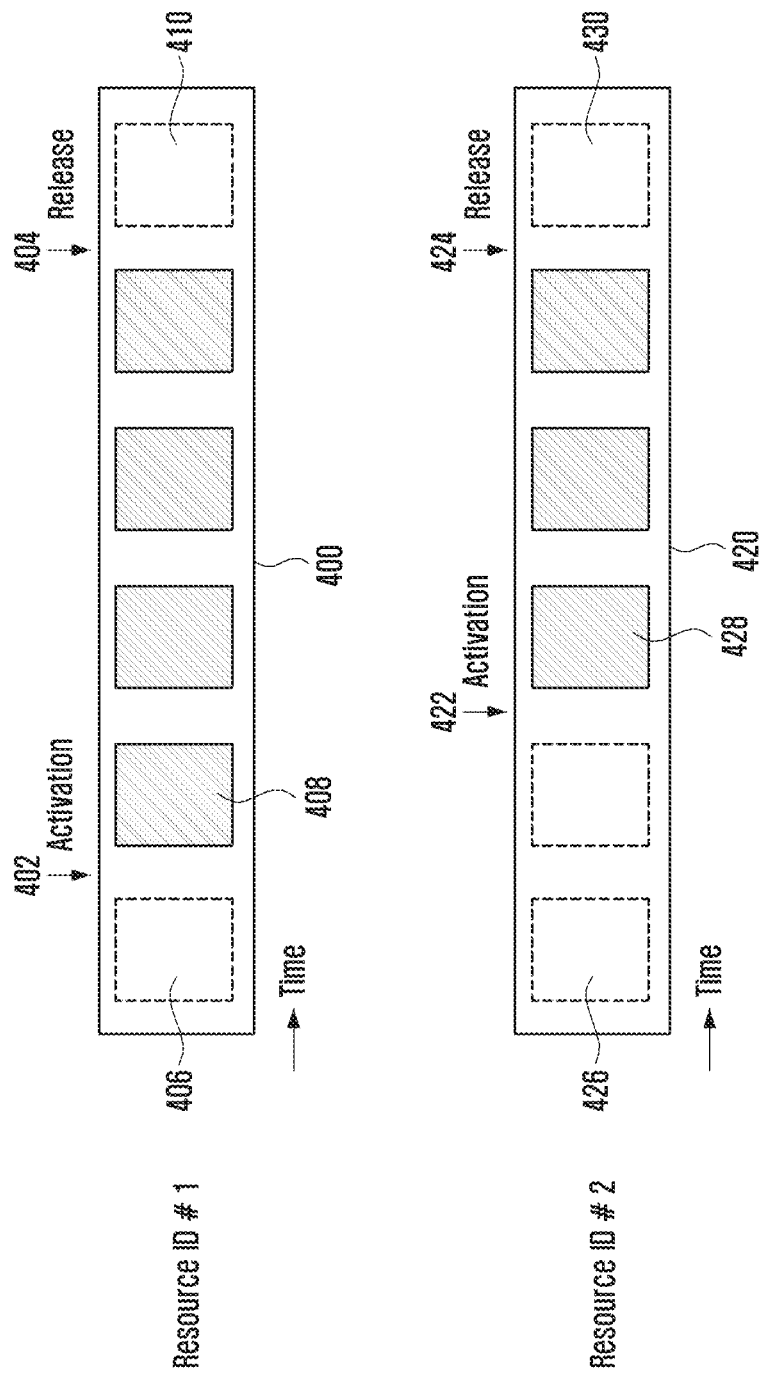
FIG. 4 is a diagram illustrating a method for activating and releasing grant-free resources through downlink control information (DCI) in a state where a plurality of grant-free resources (downlink semi persistent scheduling (DL SPS) or UL grant type 2) are configured according to an embodiment of the disclosure.

FIG. 4 is a diagram illustrating a DCI activation/release method in a situation in which a plurality of grant-free resources (DL SPS or UL grant type 2) are configured according to an embodiment of the disclosure.

Referring to FIG. 4, a situation is shown in which a base station configures two DL SPS resources (or UL grant type 2 resources) for one cell or BWP through a higher signal. If it is assumed that a first DL SPS resource (or UL grant type 2 resource) is Resource ID #1 400, and the second DL SPS resource (or UL grant type 2 resource) is Resource ID #2, it may be possible for a terminal and a base station use a specific DCI field in order to activate or release the respective resources. In this case, it may be possible for the terminal and the base station to activate or release respective DL SPS resources (or UL grant type 2 resources) using the HARQ process number. For example, Resource ID #1 that is the first DL SPS resource (or UL grant type 2 resource) may be activated or released by DCI in which the HARQ process number indicates "1". If fields constituting a DCI format that is transmitted on a DL SPS assignment PDCCH (or configured UL grant type 2 PDCCH) with respect to a specific DL SPS resource (or UL grant type 2 resource) ID are equal to those presented in Table 8, the DL SPS (or UL grant type 2) resource corresponding to the corresponding ID is activated, and if the fields are equal to those presented in Table 9, the DL SPS (or UL grant type 2) resource corresponding to the corresponding ID is released.

TABLE 8

Special field configuration information for activating DL SPS ID "x" and UL grant type 2 ID "x"

|  | DCI format 0_0/0_1 | DCI format 1_0 | DCI format 1_1 |
|---|---|---|---|
| HARQ process number | Indicate "x" | Indicate "x" | Indicate "x" |
| Redundancy version | set to '00' | set to '00' | For the enabled transport block set to '00' |

TABLE 9

Special field configuration information for releasing DL SPS ID "x" and UL grant type 2 ID "x"

|  | DCI format 0_0 | DCL format 1_0 |
|---|---|---|
| HARQ process number | Indicate "x" | Indicate "x" |
| Redundancy version | set to '00' | set to '00' |
| Modulation and coding scheme | set to all '1's | set to all '1's |
| Resource block assignment | set to all '1's | set to all '1's |

As an example, the DL SPS ID or UL grant type 2 ID may be configured as higher signal configuration information. If the ID is "5", the DL SPS resource (or UL grant type 2 resources) may be activated or released only by "5" indicated by the HARQ process number. As another example, it may be also possible that the DL SPS ID or UL grant type 2 ID are directly configured by the HARQ process number. For example, if the HARQ process number "5" is included in the higher configuration information of a specific DL SPS or UL grant type 2, the DL SPS resource (or UL grant type 2 resource) may be activated or released by the corresponding HARQ process number 5. As another example, if the HARQ process numbers "5" and "10" are included in the higher configuration information of the specific DL SPS or UL grant type 2, the DL SPS resource (or UL grant type 2 resources) may be activated or released by the corresponding HARQ process numbers "5" and "10", respectively.

As an example, FIG. 4 is a diagram illustrating an operation of individually activating and releasing the DL SPS resource (or UL grant type 2 resource) in accordance with the HARQ process numbers. The terminal may have the HARQ process number of "1" with respect to the DL SPS (or UL grant type 2) resource 400 having the ID of "1" through a higher signal, activate the corresponding resource through reception of DCI 402 including information as in Table 8, and transmit or receive grant-free based data with respect to resources 408 after reception of the DCI indicating the activation. Further, the terminal may have the HARQ process number of "1" with respect to the DL SPS (or UL grant type 2) resource 400 having the ID of "1" through the higher signal, and release the corresponding resource through reception of DCI 404 including information as in Table 9. After receiving the DCI indicating the release, the terminal is unable to transmit or receive the grant-free based data with respect to resource 410.

Further, the terminal may have the HARQ process number of "2" with respect to a DL SPS (or UL grant type 2) resource 420 having the ID of "2" through the higher signal, activate the corresponding resource through reception of DCI 422 including the information as in Table 8, and transmit or receive grant-free based data with respect to resources 428 after reception of the DCI indicating the activation. Further, the terminal may have the HARQ process number of "2" with respect to the DL SPS (or UL grant type 2) resource 420 having the ID of "1" through the higher signal, and release the corresponding resource through reception of DCI 424 including the information as in Table 9. After receiving the DCI indicating the release, the terminal is unable to transmit or receive the grant-free based data with respect to resource 430. That is, the terminal requires individual DCI in order to activate or release the resource region for the individual grant-free based data transmission and reception.

In the above-described example, although it has been described to activate or release the individual DL SPS (or UL grant type 2) through the HARQ process number, it may also be possible to use other DCI fields excluding the HARQ process number. The corresponding example may be a RV value, frequency allocation information, time allocation information, NDI value, or a transmission type, such as broadcast/multicast/unicast.

Figure 5:
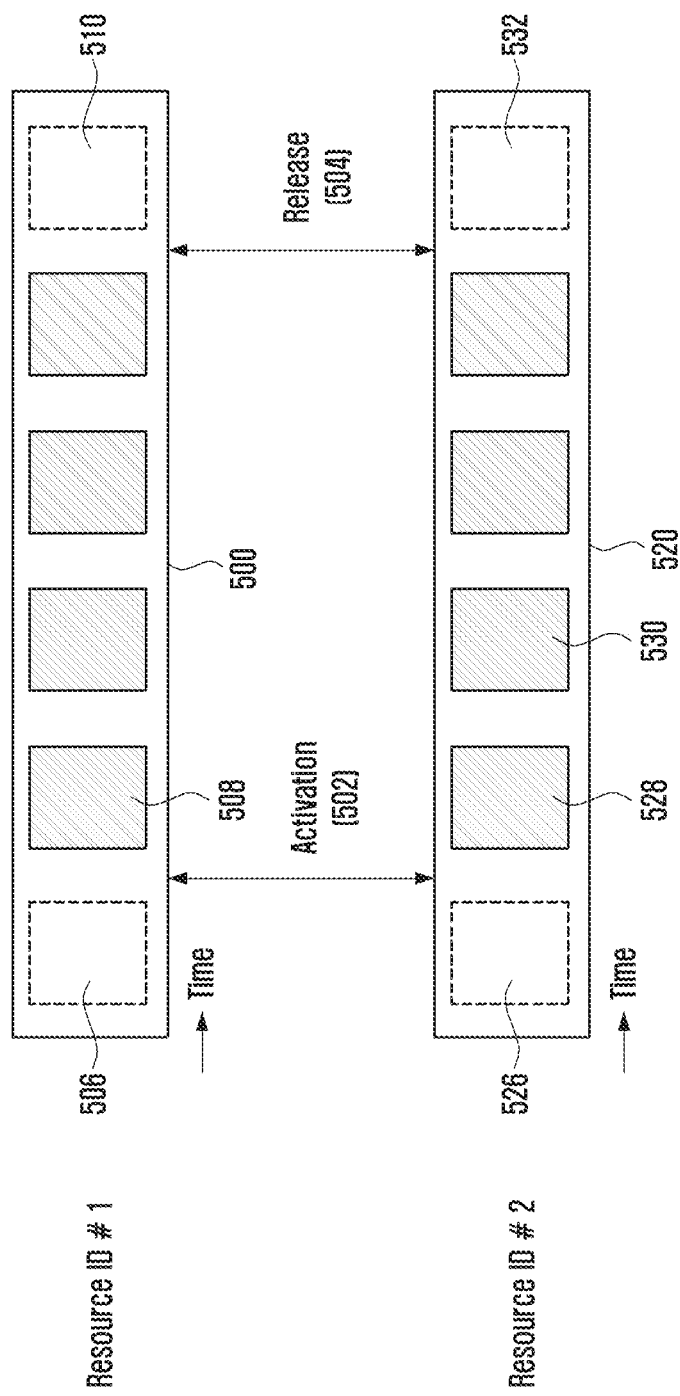
FIG. 5 is a diagram illustrating a method for activating and releasing grant-free resources through DCI in a state where a plurality of grant-free (DL SPS or UL grant type 2) resources are configured according to an embodiment of the disclosure.

FIG. 5 is a diagram illustrating a method for activating and releasing grant-free resources through DCI in a state where a plurality of grant-free (DL SPS or UL grant type 2) resources are configured according to an embodiment of the disclosure.

In a similar manner to that of FIG. 4, it may be possible for the terminal to be configured with and operate two or more DL SPS (or UL grant type 2) resources for each cell and for each BWP. With reference to FIG. 4, it has been exemplarily described that the terminal uses respective HARQ process numbers in a DCI field in order to activate or release respective DL SPS (or UL grant type 2) resources.

Referring to FIG. 5, an embodiment in which the terminal simultaneously activates or releases one or more DL SPS (or UL grant type 2) resources through one piece of DCI information. For example, if DCI 502 for activating the DL SPS (or UL grant type 2) as in Table 6 is received in a situation in which a DL SPS (or UL grant type 2) resource 500 having an ID of "1" and a DL SPS (or UL grant type 2) resource 520 having an ID of "2" are configured, the terminal activates all the DL SPS (or UL grant type 2) resource configurations preconfigured through the higher signal. Further, after receiving the DCI 502 indicating the activation, the terminal may transmit and receive grant-free based data with respect to DL SPS (or UL grant type 2) resources 508 to 528. Further, after receiving DCI 504 indicating the release, the terminal is unable to transmit or receive the grant-free based data with respect to DL SPS (or UL grant type 2) resources 510 to 532.

In order to activate two or more DL SPS (or UL grant type 2) resources through one DCI, part of next information should be transferred through a higher signal in addition to the information pre-notified through the higher signal. This is because if the information below is configured through the DCI, two or more DL SPS (or UL grant type 2) have common time and frequency allocation information, antenna port, and DMRS sequence information.

timeDomainAllocation: A field notifying of a PUSCH transmission time resource region. The value K2 indicates slot offset information for starting the UL grant type 2 transmission based on a slot in which the DCI is transmitted.

frequencyDomainAllocation: A field notifying of PUSCH transmission frequency resource region.

antennaPort: Antenna port configuration information applied to the grant-free PUSCH transmission.

dmrs-SeqInitialization: A field configured when the transform precoder is deactivated.

precodingAndNumberOfLayers.

srs-ResourceIndicator: A field notifying of SRS resource configuration information.

mcsAndTBS: MCS and TBS applied to PUSCH transmission.

frequencyHoppingOffset: A frequencyhoppingoffset value.

pathlossReferenceIndex.

timedomainoffset.

If the above-described information is configured as DL SPS (or UL grant type 2) higher signals, it may be possible for the terminal to simultaneously activate or release two or more DL SPS (or UL grant type 2) resources by the DCI indicating the activation or release. Further, it may be possible that the respective DL SPS (or UL grant type 2) resources have different pieces of information by the respective higher signal configuration. In this case, timedomainoffset information is used for the UL grant type 1 capable of transmitting and receiving the grant-free based data without receiving the DCI, and the corresponding value of timedomainoffset means the system frame number (SFN). It may be possible that the terminal uses the corresponding information as it is, or the terminal re-interprets the corresponding information as offset information of the resource capable of transmitting and receiving the grant-free based data after the slot number having received the DCI indicating the activation other than the SFN number. Further, it may be possible that the base station notifies of the offset information by K0 or K1 existing in timedomainresourceallocation instead of the timedomainoffset information. Here, K0 means an offset value between the slot in which the DCI including the activation information is transmitted and the slot in which the grant-free based PDSCH transmission (DL SPS) can start. Here, K1 means an offset value between the slot in which the DCI including the activation information is transmitted and the slot in which the grant-free based PUSCH transmission (UL grant type 2) can start.

In the case of utilizing such information, after receiving an activation signal 502 from DL SPS (or UL grant type 2) resource configuration information having an ID of "2", the terminal may transmit or receive the grant-free based data from 528 to 530 in accordance with the offset information. In the disclosure, although the offset unit has been described through a slot, the offset unit may be a symbol unit or a sub-slot (or symbol group) unit. The corresponding unit may be predetermined in the standards or it may be possible to configure the offset value through a separate higher signal.

With reference to FIG. 4, activation or release of one DL SPS (or UL grant type 2) resource corresponding to each DCI will be mainly described in a situation in which the terminal can be configured with a plurality of DL SPS (or UL grant type 2) resources for each cell and each BWP, and with reference to FIG. 5, activation or release of a plurality of DL SPS (or UL grant type 2) resources through one DCI will be described. For convenience in explanation, FIG. 4 illustrates an individual configuration method, and FIG. 5 illustrates a simultaneous configuration method.

It may be possible that the terminal supports all operations as described above with reference to FIGS. 4 and 5, and the following methods may be provided.

Method 1: Configuration Through a Higher Signal

In the case of configuring DL SPS (or UL grant type 2) resources through a higher signal, it is also notified whether the corresponding resource is activated (or released) in an individual configuration method or in a simultaneous configuration method. As another method, if specific information is true or has a value when the higher signal for configuring the DL SPS (or UL grant type 2) resource is received, the terminal considers that the corresponding resource corresponds to the simultaneous configuration method, whereas if the corresponding information is false or does not have a value, the terminal considers that the corresponding resource corresponds to the individual configuration method. Here, examples of the above-described information may be timeDomainAllocation, FrequencyDomainAllocation, AntennaPort, dmrs-SeqInitialization, precodingAndNumberOfLayers, srs-ResourceIndicator, mcsAndTBS, frequencyHoppingOffset, pathloss-ReferenceIndex, and timedomainoffset.

Method 2: Configuration Through an L1 Signal

A plurality of DL SPS (or UL grant type 2) resources are configured through the higher signal, and it is notified whether the corresponding resources are activated (or released) in the individual configuration method or in the simultaneous configuration method through the L1 signal. For example, it may be possible to apply the above-described methods through HARQ process fields as in Table 10.

TABLE 10

| DCI field information for DL SPS (or UL grant type 2) activation (or release) | |
|---|---|
| HARQ Process Number (Bitmap) | DL SPS (UL Grant Type 2) Resource Number |
| 0 (0000) | 0 |
| 1 (0001) | 1 |
| 2 (0010) | 2 |
| ... | ... |
| 15 (1111) | All |

With reference to Table 10 as an example, if the terminal receives DCI format 1_0 or DCI format 1_1 for activating the DL SPS and the HARQ process number in the corresponding DCI indicates "0", the terminal may determine that the DL SPS resource having an ID of "0" is activated. Further, if the terminal receives DCI format 0_0 or DCI format 0_1 for activating the UL grant type 2 and the HARQ process number in the corresponding DCI indicates "0", the terminal may determine that the UL grant type 2 resource having an ID of "0" is activated. If the terminal receives DCI format 1_0 or DCI format 1_1 for releasing the DL SPS and the HARQ process number in the corresponding DCI indicates "0", the terminal may determine that the DL SPS resource having an ID of "0" is released. Further, if the terminal receives DCI format 0_0 or DCI format 0_1 for releasing the UL grant type 2 and the HARQ process number in the corresponding DCI indicates "0", the terminal may determine that the UL grant type 2 resource having an ID of "0" is released.

As another example, if the terminal receives DCI format 1_0 or DCI format 1_1 for activating the DL SPS and the HARQ process number in the corresponding DCI indicates "15", the terminal may determine that all the DL SPS resources having been configured through a higher signal and having been deactivated are activated. If the terminal receives DCI format 0_0 or DCI format 0_1 for activating the UL grant type 2 and the HARQ process number in the corresponding DCI indicates "15", the terminal determines that all the UL grant type 2 resources having been configured through the higher signal and having been deactivated up to now are activated. If the terminal receives DCI format 1_0 or DCI format 1_1 for releasing the DL SPS and the HARQ process number in the corresponding DCI indicates "15", the terminal determines that all the DL SPS resources having been activated up to now are released.

If the terminal receives DCI format 0_0 or DCI format 0_1 for releasing the UL grant type 2 and the HARQ process number in the corresponding DCI indicates "15", the terminal determines that all the UL grant type 2 resources having been activated up to now are released. Here, the remainder of DCI format 0_0 or DCI format 0_1 for activating the UL grant type 2 excluding the HARQ process field may be equal to that presented in Table 6. The remainder of DCI format 1_0 or DCI format 1_1 for activating the DL SPS excluding the HARQ process field may be equal to that presented in Table 6. The remainder of DCI format 0_0 for releasing the UL grant type 2 excluding the HARQ process field may be equal to that presented in Table 7. The remainder of DCI format 1_0 for releasing the DL SPS excluding the HARQ process field may be equal to that presented in Table 7. As another example, it may be possible to use Table 10 only for the purpose of releasing the DL SPS (or UL grant type 2) resource. In this case, it may be possible to apply Table 10 only to DCI format 1_0 (or DCI format 0_0) indicating the release of the DL SPS (or UL grant type 2) resource.

In Table 10, it is assumed that one HARQ process number is mapped onto one DL SPS (or UL grant type 2) resource ID, but it may also be possible that one DL SPS (or UL grant type 2) resource is mapped onto several HARQ process numbers. As an example, in the case of configuring the DL SPS (or UL grant type 2) resource through the higher signal, it may be possible to configure one or two or more HARQ process number(s) associated with the corresponding resource IDs together. Accordingly, in the case where the terminal activates the DL SPS (or UL grant type 2) by a specific HARQ process number, it may be possible that one or more DL SPS (or UL grant type 2) associated with the corresponding numbers are simultaneously activated.

Table 11 is a table for further explanation. For example, if the terminal receives DCI format 1_0 or DCI format 1_1 for activating the DL SPS and the HARQ process number in the corresponding DCI indicates "0", the terminal may determine that the DL SPS resources having IDs of "0" and "5" are activated. Further, if the terminal receives DCI format 0_0 or DCI format 0_1 for activating the UL grant type 2 and the HARQ process number in the corresponding DCI indicates "0", the terminal may determine that the UL grant type 2 resources having IDs of "0" and "5" are activated.

If the terminal receives DCI format 1_0 or DCI format 1_1 for releasing the DL SPS and the HARQ process number in the corresponding DCI indicates "0", the terminal may determine that the DL SPS resources having IDs of "0" and "5" are released. Further, if the terminal receives DCI format 0_0 or DCI format 0_1 for releasing the UL grant type 2 and the HARQ process number in the corresponding DCI indicates "0", the terminal may determine that the UL grant type 2 resources having IDs of "0" and "5" are released.

TABLE 11

DCI field information for DL SPS (or UL grant type 2) activation (or release)

| HARQ Process Number (Bitmap) | DL SPS (UL Grant Type 2) Resource Number |
|---|---|
| 0 (0000) | 0, 5 |
| 1 (0001) | 1, 5, 10 |
| 2 (0010) | 2, 5, 12 |
| ... | ... |
| 15 (1111) | 0, 2, 3, 4, . . . , 14 |

Although the HARQ process number has been exemplarily described as the above-described L1 signal based discrimination method, it may also be possible to perform discrimination through other DCI fields (RV and MCS). The Table 11 is exemplary, and it is possible that a specific HARQ process number index has one DL SPS resource number.

In particular, an L1 signal based discrimination method may operate through a newly defined field separately from the existing HARQ process number, and in this case, a field composed of bits that are smaller than the 4-bit field indicating the HARQ process number in the DCI may be newly defined. For example, for a case in which DL SPS (or UL grant type 2) resources the number of which is smaller than 12 are configured and operated, a new field composed of 1 to 3 bits is defined, and it may be indicated what DL SPS (or UL grant type 2) resource is activated/released by a certain value (e.g., HARQ process number) indicated through the 1 to 3 bits. Further, according to such an embodiment, it is possible to newly define a DCI format. That is, a new DCI format may be defined in addition to DCI format 0_0, DCI format 0_1, DCI format 1_0, and DCI format 1_1, and the base station may include a new field according to the above-described embodiment in such a new DCI format to be transmitted to the terminal. The terminal may identify what DL SPS (or UL grant type 2) resource is to be activated or released from the new field value included in the received new DCI format, and in this case, the corresponding new field value may serve as an index of the DL SPS (or UL grant type 2) resource that is the target of activation/release. Of course, the new field value may correspond to two or more DL SPS (or UL grant type 2) resources. An example of the new field may correspond to the HARQ process number, the time resource allocation field, or the frequency resource allocation field.

Further, if the grant-free based data transmission/reception resources for broadcast/multicast/unicast are configured, it may be possible that the information associated with the HARQ process number is not determined as an ID of the grant-free based resource information, but is determined as a field indicating whether the corresponding resource information is broadcast, multicast, or unicast in accordance with the DL SPS (or UL grant type 2) resource that is configured through the higher signal. Accordingly, it may be sufficiently possible to display a transmission method as a title for broadcast, multicast, or unicast instead of the resource number described at second column in Table 10 to Table 11.

In other words, if it is possible to configure the corresponding grant-free resource in association with at least one of broadcast, multicast, or unicast instead of the grant-free resource ID, the HARQ process number may indicate at least one of transmission schemes (broadcast, multicast, or unicast) other than the ID value indicating whether to activate or release the specific grant-free resource. Accordingly, it may be possible to activate or release the resource associated with the specific transmission scheme. Table 12 is a table including examples thereof as described above. In Table 12, information, such as packet priority information or whether to support HARQ-ACK feedback, may be replaced and used in addition to the transmission schemes (broadcast, unicast, and multicast).

TABLE 12

DCI field information for DL SPS (or UL grant type 2) activation (or release)

| HARQ Process Number (Bitmap) | DL SPS (UL Grant Type 2) Resource |
|---|---|
| 0 (0000) | Broadcast |
| 1 (0001) | Unicast |
| 2 (0010) | Broadcast, Unicast |
| ... | ... |
| 15 (1111) | Broadcast, Unicast, Multicast |

According to DL SPS (or Type 2 configured grant) of Rel-15, if HARQ process numbers and redundancy versions (RV) in DCI format 1_0/1_1 (or DCI format 0_0/0_1) including CRC scrambled with CS-RNTI have specific values, the terminal determines that the corresponding DCI indicates activation of the DL SPS (or type configured grant).

In order to indicate multiple DL SPS (or type 2 configured grant) proposed in embodiments of the disclosure by the HARQ process numbers, the terminal determines that the DCI format received based on the field as in Table 13a indicates activation of the DL SPS (or type 2 configured grant). In Table 13a, M denotes the total number of DL SPS (or type 2 configured grant) configured through the higher signal. As an example, if the value M is 3, LSB 2 bits of the 4-bit HARQ process number are used to indicate an index of the DL SPS (or type 2 configured grant) being activated, and MSB 2 bits of the HARQ process number are used as a special field indicating activation of the DL SPS (or type 2 configured grant) in DCI format 1_0/1_1 (or DCI format 0_0/0_1) including CRC scrambled with CR-RNTI.

TABLE 13a

Special field configuration information for activation of multiple DL SPS and UL grant type 2

| | DCI format 0_0/0_1 | DCI format 1_0 | DCI format 1_1 |
|---|---|---|---|
| HARQ process number | If $5 \leq M < 9$, Set to MSB "0" Else if $3 \leq M < 5$, Set to MSB "00" Else if $M < 3$, Set to MSB "000" | If $5 \leq M < 9$, Set to MSB "0" Else if $3 \leq M < 5$, Set to MSB "00" Else if $M < 3$, Set to MSB "000" | If $5 \leq M < 9$, Set to MSB "0" Else if $3 \leq M < 5$, Set to MSB "00" Else if $M < 3$, Set to MSB "000" |

TABLE 13a-continued

Special field configuration information for activation of multiple DL SPS and UL grant type 2

| | DCI format 0_0/0_1 | DCI format 1_0 | DCI format 1_1 |
|---|---|---|---|
| Redundancy version | Else if M = 1 set to all '0's set to '00' | Else if M = 1 set to all '0's set to '00' | Else if M = 1 set to all '0's For the enabled transport block: set to '00' |

In order to indicate multiple DL SPS (or type 2 configured grant) proposed in embodiments of the disclosure by the HARQ process numbers, the terminal determines that the DCI format received based on the field as in Table 13b indicates release of the DL SPS (or type 2 configured grant). In Table 13b, M denotes the total number of combinations of releasable DL SPS (or type 2 configured grant) configured through the higher signal. As an example, the size of a set of releasable states of a single or multiple DL SPS resources as in Table 11 becomes M. As an example, if the value M is 3, LSB 2 bits of the 4-bit HARQ process number are used to indicate an index of the DL SPS (or type 2 configured grant) being released, and MSB 2 bits of the HARQ process number are used as a special field indicating release of the DL SPS (or type 2 configured grant) in DCI format 1_0/1_1 (or DCI format 0_0/0_1) including CRC scrambled with CR-RNTI.

TABLE 13b

Special field configuration information for release of DL SPS and UL grant type 2

| | DCI format 0_0 | DCI format 1_0 |
|---|---|---|
| HARQ process number | If 5 ≤ M < 9, Set to MSB "0" Else if 3 ≤ M < 5, Set to MSB "00" Else if M < 3, Set to MSB "000" Else if M = 1 set to all '0's | If 5 ≤ M < 9, Set to MSB "0" Else if 3 ≤ M < 5, Set to MSB "00" Else if M < 3, Set to MSB "000" Else if M = 1 set to all '0's |
| Redundancy version | set to '00' | set to '00' |
| Modulation and coding scheme | set to all '1's | set to all '1's |
| Frequency domain resource assignment | set to all '1's | set to all '1's |

Figure 6:
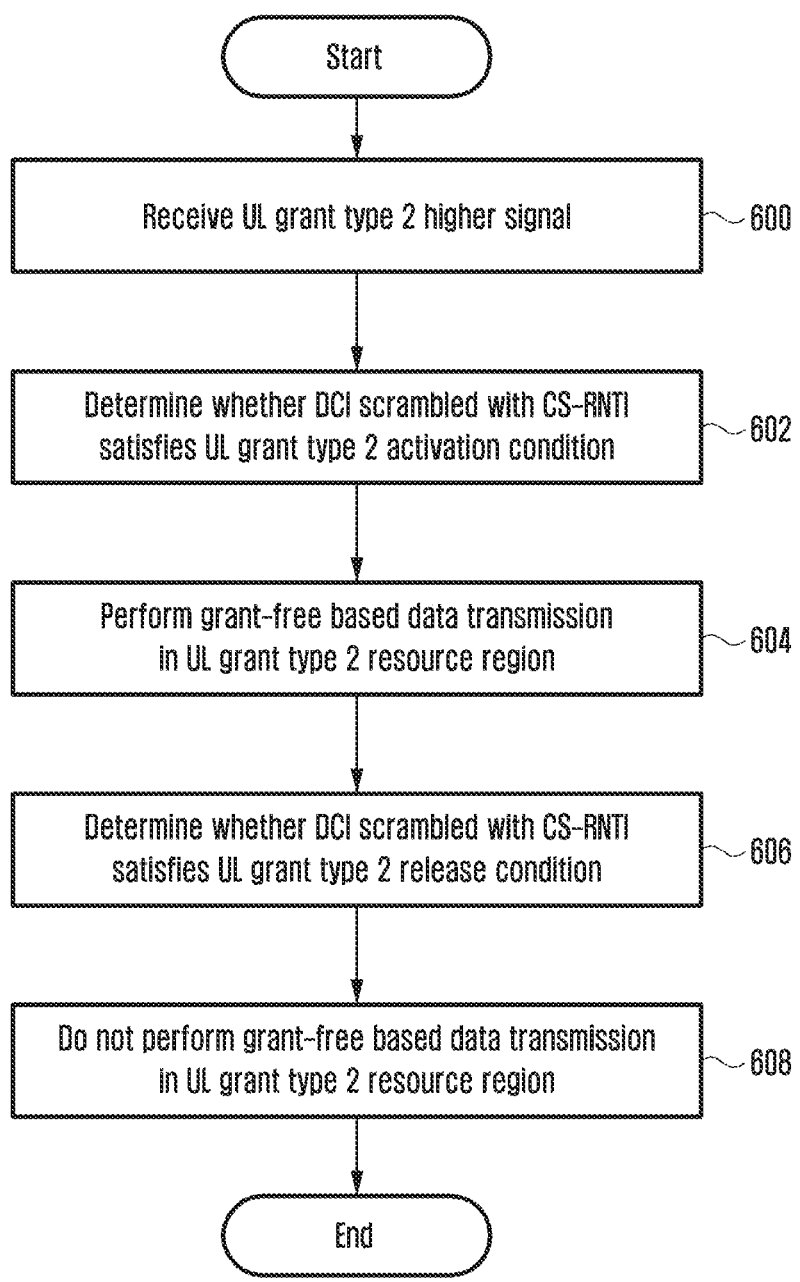
FIG. 6 is a flowchart illustrating an operation performed by a terminal for transmitting uplink data based on UL grant type 2 according to an embodiment of the disclosure.

FIG. 6 is a flowchart illustrating an operation performed by a terminal for transmitting uplink data based on UL grant type 2 according to an embodiment of the disclosure.

Referring to FIG. 6, the terminal receives a higher signal for UL grant type 2 based PUSCH transmission from the base station at 600. In this case, it may be possible for the terminal to be configured with two or more grant-free resources for each cell and for each BWP. The terminal detects DCI including CRC scrambled with CS-RNTI, and determines whether a specific field of the corresponding DCI field satisfies a condition of activation at 602 or release at 606 of UL grant type 2. Examples of such a field may correspond to RV, MCS, and frequency resource allocation field as presented in Table 6 and Table 7. If it is determined that the DCI field indicates a specific value and the corresponding value satisfies the activation or release condition of the UL grant type 2, it may be considered that the terminal has passed verification. Further, using the verification completed DCI, the terminal may activate at 604 or release at 608 a plurality of UL grant type 2 resources upwardly configured through the following methods.

Method 1: Individual Activation or Individual Release

The terminal determines that only specific UL grant type 2 resource, which is indicated by 3 bits or all bits of the least significant bits (LSB) of the HARQ process number field in the DCI having passed UL grant type 2 activation or release verification, is activated or released.

Method 2: Individual Activation or Group Release

The terminal determines that only specific UL grant type 2 resource, which is indicated by 3 bits or all bits of the LSB of the HARQ process number field in the DCI having passed UL grant type 2 activation verification, is activated. Through the DCI having passed UL grant type 2 release verification, the terminal determines that all UL grant type 2 resources being currently activated are released.

Method 3: Group Activation or Individual Release

Through the DCI having passed UL grant type 2 activation verification, the terminal determines that all UL grant type 2 resources being currently activated are activated. The terminal determines that only specific UL grant type 2 resource, which is indicated by 3 bits or all bits of the LSB of the HARQ process number field in the DCI having passed UL grant type 2 release verification, is released.

Method 4: Group Activation and Group Release

Through the DCI having passed UL grant type 2 activation verification, the terminal determines that all UL grant type 2 resources being currently deactivated are activated. The terminal determines that all the UL grant type 2 resources being currently activated are released through the DCI having passed the UL grant type 2 release verification.

Method 5: Combination of the Above-Described Methods

The terminal determines that only specific UL grant type 2 resource, which is indicated by 3 bits or all bits of the LSB of the HARQ process number field in the DCI having passed UL grant type 2 activation or release verification, is activated or released. Through the DCI having passed the UL grant type 2 activation verification, the terminal may determine to activate all the UL grant type 2 resources being currently deactivated through a specific bit value of the HARQ process number field (e.g., if 4-bit HARQ process number is 1111), or through the DCI having passed the UL grant type 2 release verification, the terminal may determine to release all the UL grant type 2 resources being currently activated.

The terminal may succeed in the detection of the DCI including CRC scrambled with CS-RNTI using one of the above-described methods, and if the corresponding DCI indicates activation of at least one grant-free based resource configured through a higher signal, the terminal may transmit the grant-free based data through the corresponding resource region. The terminal may succeed in the detection of the DCI including CRC scrambled with CS-RNTI using one of the above-described methods, and if the corresponding DCI is configured through the higher signal and it indicates release of the at least one grant-free based resource region being already activated, the terminal expects that the grant-free based data is unable to be transmitted any more through the corresponding resource region.

If the grant-free based data transmission resource activation or release condition is not satisfied (or verification has failed) although the terminal has received the DCI information including the CRC scrambled with CS-RNTI, the terminal considers that the DCI format information is received by the non-matching CRC.

In FIG. 6, the case of the UL grant type 2 has been described, but the same explanation can be sufficiently applied even to the DL SPS.

Figure 7:
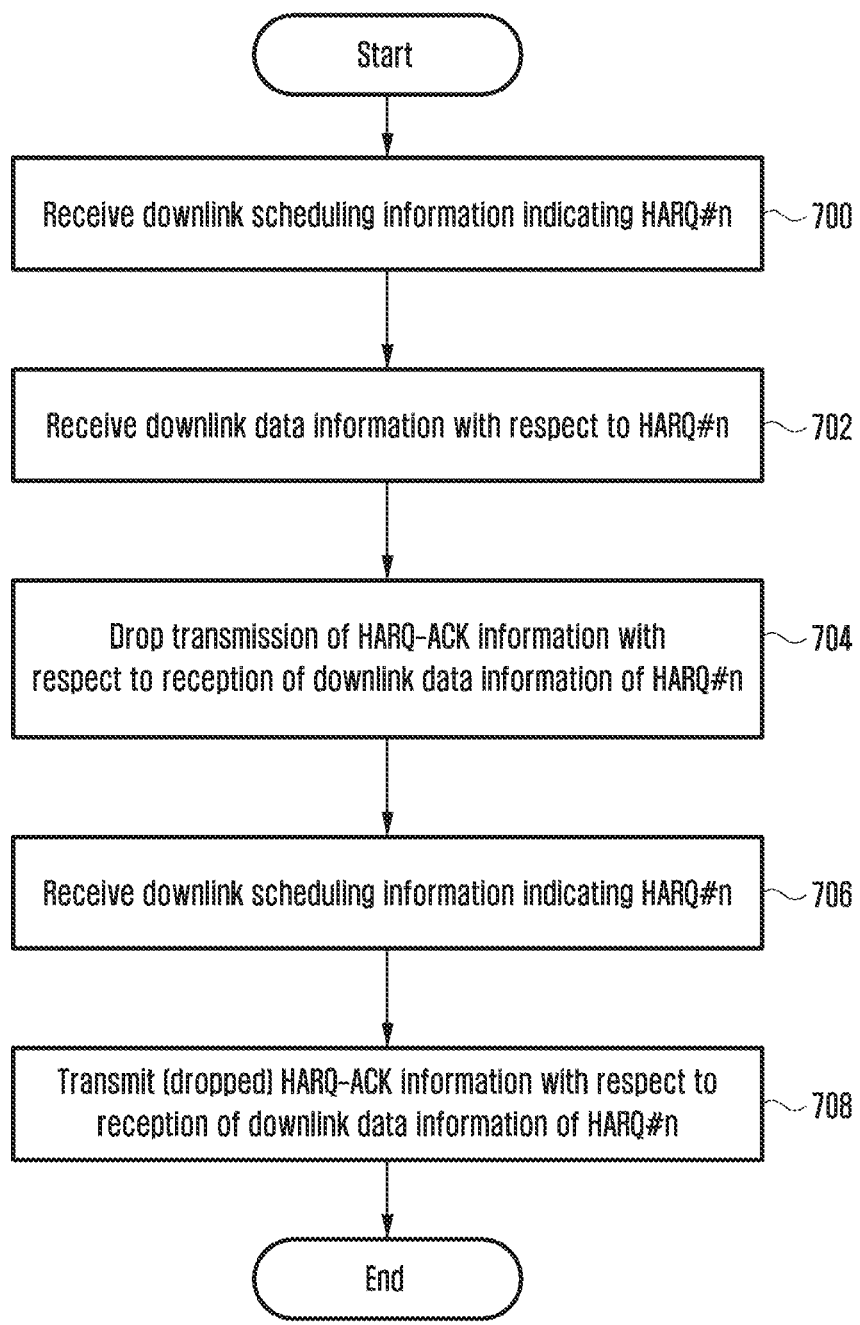
FIG. 7 is a flowchart illustrating an operation procedure performed by a terminal according to an embodiment of the disclosure.

FIG. 7 is a flowchart illustrating an operation procedure performed by a terminal according to an embodiment of the disclosure.

Referring to FIG. 7, the terminal receives the DCI from the base station, and it considers a first signal transmission/reception type for performing downlink data reception and uplink data transmission in accordance with the transmission configuration information indicated by the corresponding DCI. Specifically, in FIG. 7, a procedure, in which the terminal receives downlink data information from the base station after receiving the first DCI indicating downlink data scheduling, and then the terminal transmits corresponding HARQ-ACK information, is considered. The HARQ-ACK information includes information for the terminal to notify whether demodulation/decoding of the downlink data information has succeeded, and as an example, if the downlink data information demodulation/decoding has succeeded, the terminal transmits "1" to the base station, whereas if not, the terminal maps and transmits "0" to the base station.

The base station determines whether to retransmit the corresponding downlink data information through reception of the HARQ-ACK information, and through the HARQ-ACK procedure, the base station and the terminal can perform more reliable wireless data communication. In the 5G or NR system, the HARQ-ACK information transmission resource may be canceled due to the following causes.

1. A case where the HARQ-ACK resource is changed to the downlink resource by second DCI that is different from the first DCI.

2. A case where transmission is dropped by other uplink control information (UCI) having a higher priority than that of the HARQ-ACK resource.

3. A case where the HARQ-ACK resource at least partly overlap the uplink transmission resource indicated by the second DCI and the time or frequency resource, and the corresponding HARQ-ACK resource has a lower priority than the priority of UCI being transmitted through the overlapping uplink transmission resource.

4. A case where the base station indicates the terminal to cancel the HARQ-ACK resource transmission through the second DCI.

5. A case where the base station schedules the downlink data resource having the same HARQ process number before the HARQ-ACK resource transmission through the second DCI.

The above-described causes are merely exemplary, and it may be possible that the terminal drops the HARQ-ACK transmission resource indicated through the first DCI in other various cases. Further, the above-described examples consider a situation in which the terminal receives the second DCI from the base station before transmitting the HARQ-ACK information on the HARQ-ACK transmission resource configured through the first DCI. Further, in a normal situation, the first DCI may be first transmitted from the base station to the terminal, and thereafter the second DCI may be transmitted. In this case, a case where the terminal cancels the HARQ-ACK information transmission through the DCI received after transmitting the HARQ-ACK information should not occur. Further, because the terminal requires time for performing blind decoding of the second DCI, the base station should transmit the second DCI in consideration of the processing time required for the terminal to decode the second DCI before the HARQ-ACK information transmission and to determine the processing time. Otherwise, the terminal is unable to expect that the terminal drops the transmission of the HARQ-ACK information scheduled through the first DCI.

FIG. 7 illustrates a corresponding terminal procedure. As an example, the terminal receives the first DCI including the HARQ process number n at 700, and it receives downlink data information in accordance with the configuration information of the first DCI at 702. The terminal generates HARQ-ACK information for the downlink data demodulation/decoding result, and it cancels or drops actual HARQ-ACK information transmission at 704 due to at least one of the above-described causes before the transmission. In this situation, the base station is unable to receive a feedback of the HARQ-ACK including downlink data information transmission success/failure information related to the HARQ process number, and it is necessary to receive this through a separate indicator. If the base station, like the existing method, determines the result of the corresponding HARQ-ACK reception as NACK and it schedules the retransmission, waste of the downlink data resource may occur. In an LTE or NR system, the probability that NACK occurs on the HARQ-ACK is less than 10%, and thus it is wasteful from the viewpoint of using the system radio resources to determine that the HARQ-ACK information drop situation indicated by the first DCI as described above is unconditionally NACK. Accordingly at least one of the following methods may be considered.

Method 1: Scheduling through DCI including the same HARQ process number n

If third DCI information transmitted from the base station at 706 includes the same HARQ process number n as that of the first DCI after transmission of the HARQ-ACK information scheduled through the first DCI is dropped, the terminal determines that the corresponding third DCI information is information for retransmitting the existing dropped HARQ-ACK information. Accordingly, the terminal determines that only the HARQ-ACK information resource constituting the third DCI information is effective, but other fields related to other downlink or uplink data scheduling are not effective.

Method 2: Scheduling of DCI that includes the same HARQ process number n and other specific DCI field is fixed to a specific value If the third DCI information 706 transmitted from the base station includes the same HARQ process number n as the first DCI after the HARQ-ACK information transmission scheduled through the first DCI is dropped, and the value of a specific DCI field indicates a specific value, the terminal determines that the corresponding third DCI information is information for retransmitting the existing dropped HARQ-ACK information. An example of the specific DCI field value may correspond to a case where all frequency resource allocation field bitmaps indicate "0" or "1". Further, a case where other MCS information indicates the specific value may also be another example. Accordingly, the terminal may determine that only the HARQ-ACK information resource constituting the third DCI information is effective and it may determine that other fields related to other downlink or uplink data scheduling are not effective.

The terminal transmits the HARQ-ACK information for downlink data related to the HARQ process n dropped to the HARQ-ACK resource region indicated by at least one of the above-described methods at 708.

Figure 8:
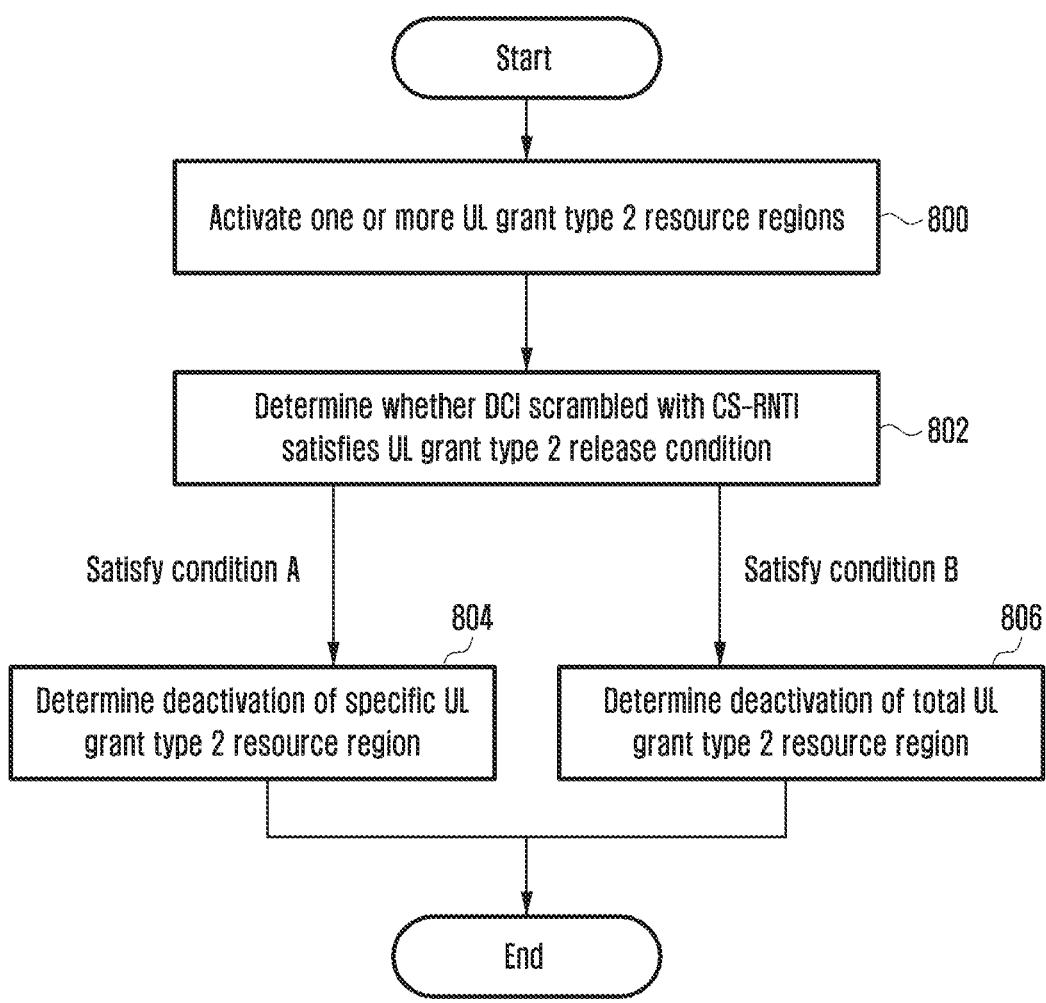
FIG. 8 is a flowchart illustrating a method for releasing grant-free resources in a state where a plurality of grant-free (DL SPS or UL grant type 2) resources are configured according to an embodiment of the disclosure.

FIG. 8 is a flowchart illustrating a method for releasing grant-free resources in a state where a plurality of grant-free (DL SPS or UL grant type 2) resources are configured according to an embodiment of the disclosure.

Referring to FIG. 8, in the case of DL SPS, the terminal may receive data with respect to a plurality of DL SPS and it may report the HARQ-ACK on the corresponding PUCCH or PUSCH resource in a situation in which one or more grant-free (DL SPS or UL grant type 2) resource regions are activated at 800. Specifically, if DL SPS resources at least partly overlap each other, the terminal may report the HARQ-ACK information on the corresponding PUCCH or PUSCH resource only with respect to the resource having highest DL SPS resource number or low DL SPS.

Next, in the case of UL grant type 2, the terminal may transmit data with respect to a plurality of UL grant type 2 resources. If the UL grant type 2 resources overlap each other at a specific time, the terminal may transmit the uplink resources with respect to the UL grant type 2 resource being optionally selected or having the highest or lowest UL grant type 2 resource number at a specific time. The above described resource number may be given as the higher signal or L1 signal during DL SPS or UL grant type 2 configuration. The resource number may be replaced by a priority number.

Next, a method for releasing corresponding resources in a situation in which a plurality of grant-free resources are configured will be described. For scheduling release, the terminal checks validity at 802 in order to validate whether DL SPS allocation PDCCH or configured UL grant PDCCH satisfies the following condition (801).

Condition 1: Scrambling with CS-RNTI that the CRC of the corresponding DCI format gives to a higher signal cs-RNTI Condition 2: A new data indicator (NDI) field for the enabled transport block indicates "0".

As an example, if the corresponding DCI format is as in the next table 13a, the terminal may determine at 804 to indicate a valid release for a specific resource X among pre-activated grant-free resource (DL SPS or UL grant type 2).

TABLE 13a

|  | DCI format 0_0/DCI format 1_0 |
| --- | --- |
| HARQ process number | X |
| Redundancy version | set to '00' |
| Modulation and coding scheme | set to all '1' |
| Frequency domain resource assignment | set to all '1's |

As another example, if the corresponding DCI format is as presented in Table 13b, the terminal may determine at 804 to indicate a valid release for a specific resource X among pre-activated grant-free resource (DL SPS or UL grant type 2).

TABLE 13b

|  | DCI format 0_0/DCI format 1_0 |
| --- | --- |
| HARQ process number | set to all '0' |
| Redundancy version | set to '00' |
| Modulation and coding scheme | X |
| Frequency domain resource assignment | set to all '1's |

As still another example, if the corresponding DCI format is as presented in Table 13c, the terminal may determine at 806 to indicate a valid release for a specific resource X among pre-activated grant-free resource (DL SPS or UL grant type 2).

TABLE 13c

|  | DCI format 0_0/DCI format 1_0 |
| --- | --- |
| HARQ process number | set to all '0' |
| Redundancy version | set to '00' |
| Modulation and coding scheme | set to all '1's |
| Frequency domain resource assignment | set to all '0's |

As still another example, if the corresponding DCI format is as presented in Table 13d, the terminal may determine (806) to indicate a valid release for a specific resource X among pre-activated grant-free resource (DL SPS or UL grant type 2).

TABLE 13d

|  | DCI format 0_0/DCI format 1_0 |
| --- | --- |
| HARQ process number | set to all '0' |
| Redundancy version | set to '00' |
| Modulation and coding scheme | set to all '1's |
| Frequency domain resource assignment | set to all '1's |

As still another example, if the corresponding DCI format is as presented in Table 13e, the terminal may determine (806) to indicate a valid release for a specific resource X among pre-activated grant-free resource (DL SPS or UL grant type 2).

TABLE 13e

|  | DCI format 0_0/DCI format 1_0 |
| --- | --- |
| HARQ process number | set to all '1' |
| Redundancy version | set to '11' |
| Modulation and coding-scheme | set to all '1's |
| Frequency domain resource assignment | set to all '1's |

As still another example, if the corresponding DCI format is as presented in Table 13f, the terminal may determine (1006) to indicate a valid release for a specific resource X among pre-activated grant-free resource (DL SPS or UL grant type 2).

TABLE 13f

|  | DCI format 0_0/DCI format 1_0 |
| --- | --- |
| HARQ process number | set to all '0' |
| Redundancy version | set to '11' |
| Modulation and coding scheme | set to all '1's |
| Frequency domain resource assignment | set to all '1's |

As still another example, it may be possible that the terminal determines that all the pre-activated grant-free (DL SPS or UL grant type 2) resources have been cleared in the corresponding BWP with respect to the BWP deactivated in a specific serving cell. The terminal may determine that all the pre-activated UL grant type 1 resources have suspended in the corresponding BWP with respect to the deactivated BWP in a specific serving cell. With respect to the activated BWP in the specific serving cell, the terminal determines that all the suspended UL grant type 1 resources have been (re)initialized.

Figure 9:
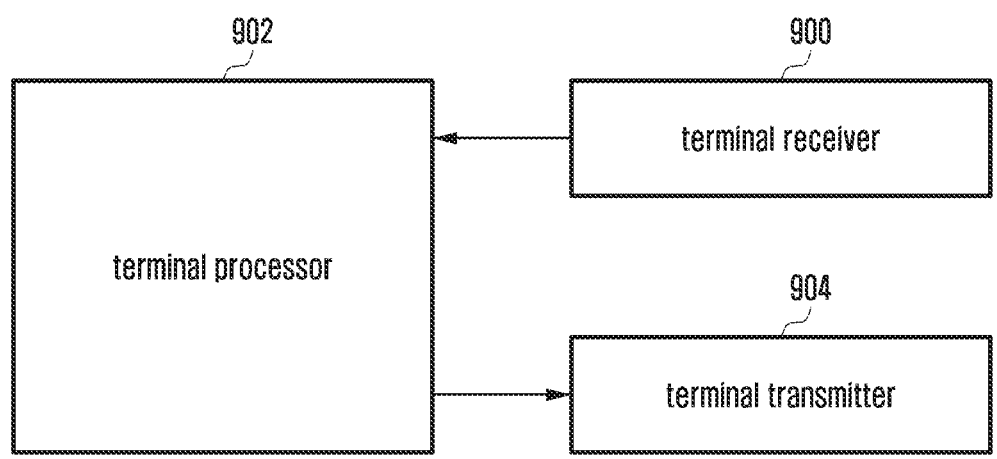
FIG. 9 is a block diagram illustrating the structure of a terminal according to an embodiment of the disclosure.

FIG. 9 is a block diagram illustrating the structure of a terminal according to an embodiment of the disclosure.

Referring to FIG. 9, a terminal according to the disclosure may include a terminal receiver 900, a terminal transmitter 904, and at least one terminal processor 902. In an embodiment, the terminal receiver 900 and the terminal transmitter 904 may be commonly called a transceiver unit. The transceiver unit may transmit/receive a signal with a base station. The signal may include control information and data. For this, the transceiver unit may be composed of an RF transmitter for up-converting and amplifying the frequency of a transmitted signal, and an RF receiver for low-noise-amplifying and down-converting the frequency of a received signal. Further, the transceiver unit may receive a signal through a radio channel, and may output the received signal to the terminal processor 902. The transceiver unit may also transmit the signal that is output from the terminal processor 902 through the radio channel. The terminal processor 902 may control a series of processes so as to operate according to the above-described embodiments.

Figure 10:
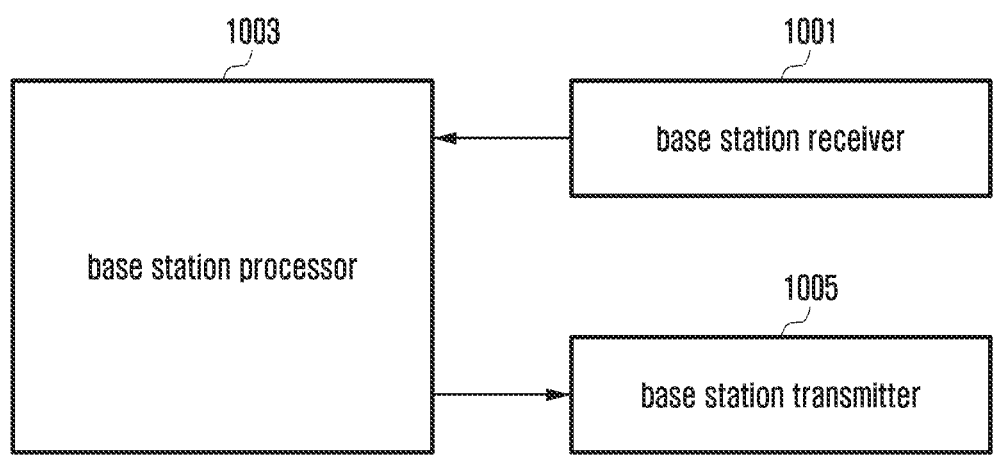
FIG. 10 is a diagram illustrating the structure of a base station according to an embodiment of the disclosure.

FIG. 10 is a diagram illustrating the structure of a base station according to an embodiment of the disclosure.

Referring to FIG. 10, a base station according to an embodiment may include at least one of a base station receiver 1001, a base station transmitter 1005, and at least one base station processor 1003. In an embodiment of the disclosure, the base station receiver 1001 and the base station transmitter 1005 may be commonly called a transceiver unit. The transceiver unit may transmit/receive a signal with a terminal. The signal may include control information and data. For this, the transceiver unit may be composed of an RF transmitter for up-converting and amplifying the frequency of a transmitted signal, and an RF receiver for low-noise-amplifying and down-converting the frequency of a received signal. Further, the transceiver unit may receive a signal through a radio channel, and may output the received signal to the base station processor 1003. The transceiver unit may also transmit the signal that is output from the base station processor 1003 through the radio channel. The base station processor 1003 may control a series of processes so as to operate according to the above-described embodiments.

Embodiments of the disclosure that are described in the specification and drawings are merely for easy explanation of the technical contents of the disclosure and proposal of specific examples to help understanding of the disclosure, but are not intended to limit the scope of the disclosure. That is, it will be apparent to those of ordinary skill in the art to which the disclosure pertains that other modified examples that are based on the technical idea of the disclosure can be embodied. Further, according to circumstances, the respective embodiments may be operated in combination. For example, parts of the first, second, and third embodiments of the disclosure may be combined with each other to operate the base station and the terminal. Further, although the above-described embodiments have been proposed on the basis of an NR system, other modified examples based on the technical idea of the above-described embodiments may be embodied in other systems, such as FDD and time division duplex (TDD) LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a message including a plurality of grant free resource configurations, the message configuring a correspondence between a grant free resource configuration and hybrid automatic repeat request (HARQ) process number information;
   receiving, from the base station, first downlink control information (DCI) including the HARQ process number information;
   identifying grant free resource configurations among the plurality of grant free resource configurations, the grant free resource configurations corresponding to a value of the HARQ process number information; and
   releasing grant free resources for the grant free resource configurations based on a value of redundancy version information, a value of modulation and coding scheme information, and a value of frequency domain resource assignment information included in the first DCI.

2. The method of claim 1, further comprising:
   receiving, from the base station, second DCI including the HARQ process number information;
   identifying at least one grant free resource configuration among the plurality of grant free resource configurations based on a value of the HARQ process number information included in the second DCI; and
   activating at least one grant free resource corresponding to the at least one grant free resource configuration based on the second DCI,
   wherein the at least one grant free resource corresponding to the at least one grant free resource configuration is activated, based on a value of redundancy version information included in the second DCI.

3. The method of claim 1, wherein the grant free resource includes a downlink semi-persistent scheduling (DL SPS) physical downlink shared channel (PDSCH) or an uplink (UL) grant type 2 physical uplink shared channel (PUSCH).

4. The method of claim 1, wherein the first DCI is validated, in case that a cyclic redundancy check (CRC) bit of the first DCI is scrambled with a configured scheduling radio network temporary identifier (CS-RNTI), and new data indicator (NDI) field in the first DCI for an enabled transport block is set to 0.

5. A method performed by a base station in a wireless communication system, the method comprising:
   transmitting, to a terminal, a message including a plurality of grant free resource configurations, the message configuring a correspondence between a grant free resource configuration and hybrid automatic repeat request (HARQ) process number information; and
   transmitting, to the terminal, first downlink control information (DCI) including the HARQ process number information,
   wherein grant free resources for grant free resource configurations are released based on the first DCI, and the grant free resource configurations among the plurality of grant free resource configurations correspond to a value of the HARQ process number information, and
   wherein the grant free resources are released based on a value of redundancy version information, a value of modulation and coding scheme information, and a value of frequency domain resource assignment information included in the first DCI.

6. The method of claim 5, further comprising:
transmitting, to the terminal, second DCI including the HARQ process number information,
wherein at least one grant free resource corresponding to at least one grant free resource configuration identified based on a value of the HARQ process number information included in the second DCI is activated based on the second DCI, and
wherein the at least one grant free resource corresponding to the at least one grant free resource configuration is activated, based on a value of redundancy version information included in the second DCI.

7. The method of claim 5, wherein the grant free resource includes a downlink semi-persistent scheduling (DL SPS) physical downlink shared channel (PDSCH) or an uplink (UL) grant type 2 physical uplink shared channel (PUSCH).

8. The method of claim 5, wherein the first DCI is validated, in case that a cyclic redundancy check (CRC) bit of the first DCI is scrambled with a configured scheduling radio network temporary identifier (CS-RNTI), and new data indicator (NDI) field in the first DCI for an enabled transport block is set to 0.

9. A terminal in a wireless communication system, the terminal comprising:
a transceiver configured to transmit or receive a signal; and
a controller configured to:
receive, from a base station, a message including a plurality of grant free resource configurations, the message configuring a correspondence between a grant free resource configuration and hybrid automatic repeat request (HARQ) process number information,
receive, from the base station, first downlink control information (DCI) including the HARQ process number information,
identify grant free resource configurations among the plurality of grant free resource configurations, the grant free resource configurations corresponding to a value of the HARQ process number information, and
release grant free resources for the grant free resource configurations based on a value of redundancy version information, a value of modulation and coding scheme information, and a value of frequency domain resource assignment information included in the first DCI.

10. The terminal of claim 9, wherein the controller is further configured to:
receive, from the base station, second DCI including the HARQ process number information,
identify at least one grant free resource configuration among the plurality of grant free resource configurations based on a value of the HARQ process number information included in the second DCI, and
activate at least one grant free resource corresponding to the at least one grant free resource configuration based on the second DCI,
wherein the at least one grant free resource corresponding to the at least one grant free resource configuration is activated, based on a value of redundancy version information included in the second DCI.

11. The terminal of claim 9, wherein the grant free resource includes a downlink semi-persistent scheduling (DL SPS) physical downlink shared channel (PDSCH) or an uplink (UL) grant type 2 physical uplink shared channel (PUSCH).

12. The terminal of claim 9, wherein the first DCI is validated, in case that a cyclic redundancy check (CRC) bit of the first DCI is scrambled with a configured scheduling radio network temporary identifier (CS-RNTI), and new data indicator (NDI) field in the first DCI for an enabled transport block is set to 0.

13. A base station in a wireless communication system, the base station comprising:
a transceiver configured to transmit and receive a signal; and
a controller configured to:
transmit, to a terminal, a message including a plurality of grant free resource configurations, the message configuring a correspondence between a grant free resource configuration and hybrid automatic repeat request (HARQ) process number information, and
transmit, to the terminal, first downlink control information (DCI) including the HARQ process number information,
wherein grant free resources for grant free resource configurations are released based on the first DCI, and the grant free resource configurations among the plurality of grant free resource configurations correspond to a value of the HARQ process number information, and
wherein the grant free resources are released based on a value of redundancy version information, a value of modulation and coding scheme information, and a value of frequency domain resource assignment information included in the first DCI.

14. The base station of claim 13, wherein the controller is further configured to:
transmit, to the terminal, second DCI including the HARQ process number information,
wherein at least one grant free resource corresponding to at least one grant free resource configuration identified based on a value of the HARQ process number information included in the second DCI is activated based on the second DCI, and
wherein the at least one grant free resource corresponding to the at least one grant free resource configuration is activated, based on a value of redundancy version information included in the second DCI.

15. The base station of claim 13, wherein the grant free resource includes a downlink semi-persistent scheduling (DL SPS) physical downlink shared channel (PDSCH) or an uplink (UL) grant type 2 physical uplink shared channel (PUSCH).

16. The base station of claim 13, wherein the first DCI is validated, in case that a cyclic redundancy check (CRC) bit of the first DCI is scrambled with a configured scheduling radio network temporary identifier (CS-RNTI), and new data indicator (NDI) field in the first DCI for an enabled transport block is set to 0.

* * * * *